(12) United States Patent
Krieger et al.

(10) Patent No.: US 7,408,061 B2
(45) Date of Patent: Aug. 5, 2008

(54) RYLENE DYES

(75) Inventors: Matthias Krieger, Loerrach (DE); Arno Boehm, Mannheim (DE); Lorenz Siggel, Heidelberg (DE); Stefan Becker, Mannheim (DE); Klaus Muellen, Cologne (DE); Christopher Kohl, Mainz (DE)

(73) Assignees: BASF Aktiengesellschaft, Ludwigshafen (DE); Max-Planck-Gesellschaft zur Foerderung der Wissenschaften e.V., Munich (DE)

( * ) Notice: Subject to any disclaimer, the term of this patent is extended or adjusted under 35 U.S.C. 154(b) by 421 days.

(21) Appl. No.: 10/522,990

(22) PCT Filed: Jul. 25, 2003

(86) PCT No.: PCT/EP03/08191

§ 371 (c)(1), (2), (4) Date: Feb. 2, 2005

(87) PCT Pub. No.: WO2004/026965

PCT Pub. Date: Apr. 1, 2004

(65) Prior Publication Data

US 2006/0075585 A1   Apr. 13, 2006

(30) Foreign Application Priority Data

Aug. 20, 2002   (DE) .............................. 102 38 994

(51) Int. Cl.
*C07D 471/22* (2006.01)
*D06P 1/00* (2006.01)

(52) U.S. Cl. .................... 546/27; 8/636; 106/22 R; 524/90; 524/91; 546/26

(58) Field of Classification Search ............... 546/27, 546/26; 524/91, 90; 106/22 R; 8/636
See application file for complete search history.

(56) References Cited

U.S. PATENT DOCUMENTS 2,069,663 A   2/1937   Wolfram et al.

FOREIGN PATENT DOCUMENTS

| DE | 607 341 | 12/1934 |
|---|---|---|
| DE | 2 212 370 | 9/1973 |
| DE | 101 08 156 | 8/2002 |
| EP | 0 999 239 | 5/2000 |
| WO | 01/16109 | 3/2001 |
| WO | 02/068538 | 9/2002 |

OTHER PUBLICATIONS

Kohl, Christopher et al. "Bis(rylenedicarboximide)-a,d-1,5-diaminoanthraquinones as unique infrared absorbing dyes", Chem. Communications, pp. 2778-2779, XP002256670.

*Primary Examiner*—Charanjit S. Aulakh
(74) *Attorney, Agent, or Firm*—Oblon, Spivak, McClelland, Maier & Neustadt, P.C.

(57) ABSTRACT

Rylene dyes of the general formula I

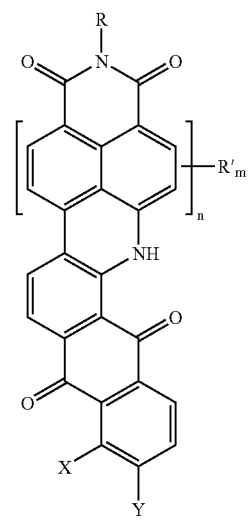

where the variables are defined as follows:
R is hydrogen; optionally substituted $C_1$-$C_{30}$-alkyl, $C_5$-$C_8$-cycloalkyl, aryl or hetaryl;
R' is bromine; cyano; —$NR^3_2$; optionally substituted aryloxy, arylthio, hetaryloxy or hetarylthio; optionally substituted $C_3$-$C_{18}$-alk-1-ynyl;
X, Y are both hydrogen or together are a radical of the formula Ia

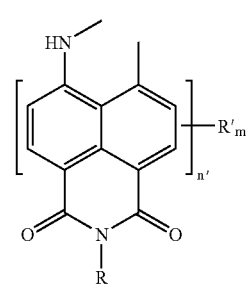

n is 2, 3, 4 or additionally 1 when X and Y are a radical of the formula Ia;
n' is from 1 to 4;
m is from 0 to 6.

12 Claims, No Drawings

RYLENE DYES

The present invention relates to novel rylene dyes of the general formula I

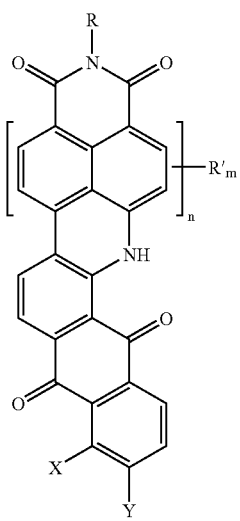

I where the variables are defined as follows:
R is hydrogen;
  $C_1$-$C_{30}$-alkyl whose carbon chain may be interrupted by one or more —O—, —S—, —$NR^1$—, —CO— and/or —$SO_2$— moieties and may be mono- or polysubstituted by carboxyl, sulfo, hydroxyl, cyano, $C_1$-$C_6$-alkoxy and/or a 5- to 7-membered heterocyclic radical which is bonded via a nitrogen atom and may contain further heteroatoms and be aromatic;
  $C_5$-$C_8$-cycloalkyl whose carbon framework may be interrupted by one or more —O—, —S— and/or —$NR^1$— moieties and may be mono- or polysubstituted by $C_1$-$C_6$-alkyl;
  aryl or hetaryl which may each be mono- or polysubstituted by $C_1$-$C_{18}$-alkyl, $C_1$-$C_6$-alkoxy, halogen, hydroxyl, cyano, carboxyl, —$CONHR^2$, —$NHCOR^2$ and/or aryl- or hetarylazo, each of which may be substituted by $C_1$-$C_{10}$-alkyl, $C_1$-$C_6$-alkoxy, halogen, hydroxyl, cyano and/or carboxyl;
R' is bromine; cyano; —$NR^3_2$;
  aryloxy, arylthio, hetaryloxy or hetarylthio, each of which may be mono- or polysubstituted by $C_1$-$C_{12}$-alkyl, $C_1$-$C_{12}$-alkoxy, cyano, —$CONHR^2$ and/or —$NHCOR^2$;
  $C_3$-$C_{18}$-alk-1-ynyl whose carbon chain may be interrupted by one or more —O—, —S—, —$NR^1$—, —CO— and/or —$SO_2$— moieties and may be mono- or polysubstituted by —$COOR^1$, —$SO_3R^1$, hydroxyl, cyano, $C_1$-$C_6$-alkoxy, $C_5$-$C_8$-cycloalkyl, aryl and/or a 5- to 7-membered heterocyclic radical which is bonded via a nitrogen atom and may contain further heteroatoms and be aromatic;
$R^1$ is hydrogen or $C_1$-$C_6$-alkyl;
$R^2$ is hydrogen; $C_1$-$C_{18}$-alkyl; aryl or hetaryl, each of which may be substituted by $C_1$-$C_8$-alkyl, $C_1$-$C_6$-alkoxy, halogen, hydroxyl and/or cyano;
$R^3$ is hydrogen; $C_1$-$C_{18}$-alkyl; aryl or hetaryl, each of which may be substituted by $C_1$-$C_8$-alkyl, $C_1$-$C_6$-alkoxy, halogen, hydroxyl and/or cyano; both $R^3$ radicals may be joined to give a 5- to 7-membered heterocyclic radical which contains the nitrogen atom and is bonded via it;
X, Y are both hydrogen or bonded together to form a six-membered ring in a radical of the formula Ia

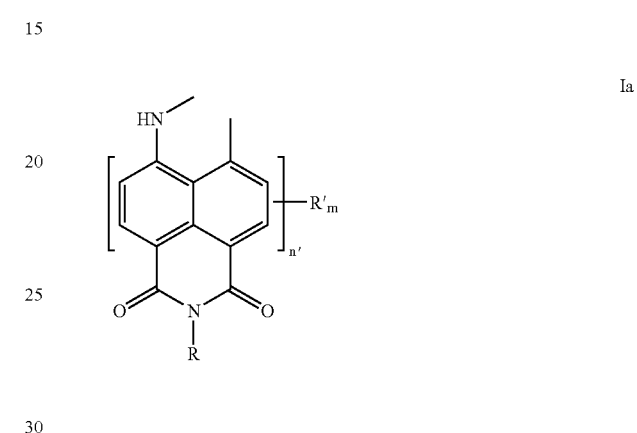

Ia where X is the —NH— group and Y is the other free chemical bond;
n is 2, 3, 4 or additionally 1 when X and Y are a radical of the formula Ia;
n' is from 1 to 4;
m is from 0 to 6, and also to the preparation of the rylene dyes I and to their use for coloring high molecular weight organic and inorganic materials, in particular plastics, paints and printing inks, as dispersants, pigment additives for organic pigments and intermediates for the preparation of pigment additives, for producing aqueous polymer dispersions which are colored or absorb in the near infrared region of the electromagnetic spectrum and as a photoconductor in electrophotography.

Aminoanthraquinone-linked rylene vat dyes have been known for some time. DRP 607 341 and U.S. Pat. No. 2,069,663 describe rylene vat dyes based on naphthalenedicarboximides which color cotton from a red or red-violet vat to blue-green and are prepared from 4-bromonaphthalenedicarboxylic anhydride by subsequent imidation of the anhydridic coupling product with 1-aminoanthraquinone. However, neither aminoanthraquinone-linked rylene dyes of the higher homologs of naphthalene nor double-aminoanthraquinone-linked rylene vat dyes are yet known and, owing to the decreasing solubility with increasing rylene length, the rylenedicarboxylic anhydrides can also not be obtained by the preparative methods described for naphthalenedicarboxylic anhydride.

It is an object of the present invention to provide rylene dyes which absorb in the long-wavelength, i.e. in the red and infrared, region of the electromagnetic spectrum.

We have found that this object is achieved by the rylene dyes of the formula I defined at the outset.

Preferred rylene dyes can be taken from the subclaim.

A process has also been found for preparing the rylene dyes of the formula I'

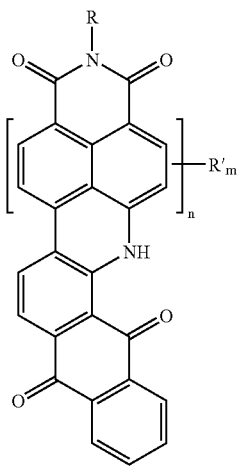

where the variables are defined as follows:

R is hydrogen;
  C$_1$-C$_{30}$-alkyl whose carbon chain may be interrupted by one or more —O—, —S—, —NR$^1$—, —CO— and/or —SO$_2$— moieties and may be mono- or polysubstituted by carboxyl, sulfo, hydroxyl, cyano, C$_1$-C$_6$-alkoxy and/or a 5- to 7-membered heterocyclic radical which is bonded via a nitrogen atom and may contain further heteroatoms and be aromatic;
  C$_5$-C$_8$-cycloalkyl whose carbon framework may be interrupted by one or more —O—, —S— and/or —NR$^1$— moieties and may be mono- or polysubstituted by C$_1$-C$_6$-alkyl;
  aryl or hetaryl which may each be mono- or polysubstituted by C$_1$-C$_{18}$-alkyl, C$_1$-C$_6$-alkoxy, halogen, hydroxyl, cyano, carboxyl, —CONHR$^2$, —NHCOR$^2$ and/or aryl- or hetarylazo, each of which may be substituted by C$_1$-C$_{10}$-alkyl, C$_1$-C$_6$-alkoxy, halogen, hydroxyl, cyano or carboxyl;

R' is bromine; cyano; —NR$^3$$_2$;
  aryloxy, arylthio, hetaryloxy or hetarylthio, each of which may be mono- or polysubstituted by C$_1$-C$_{12}$-alkyl, C$_1$-C$_{12}$-alkoxy, cyano, —CONHR$^2$ and/or —NHCOR$^2$;
  C$_3$-C$_{18}$-alk-1-ynyl whose carbon chain may be interrupted by one or more —O—, —S—, —NR$^1$—, —CO— and/or —SO$_2$— moieties and may be mono- or polysubstituted by —COOR$^1$, —SO$_3$R$^1$, hydroxyl, cyano, C$_1$-C$_6$-alkoxy, C$_5$-C$_8$-cycloalkyl, aryl and/or a 5- to 7-membered heterocyclic radical which is bonded via a nitrogen atom and may contain further heteroatoms and be aromatic;

R$^1$ is hydrogen or C$_1$-C$_6$-alkyl;
R$^2$ is hydrogen; C$_1$-C$_{18}$-alkyl; aryl or hetaryl, each of which may be substituted by C$_1$-C$_8$-alkyl, C$_1$-C$_6$-alkoxy, halogen, hydroxyl or cyano;
R$^3$ is hydrogen; C$_1$-C$_{18}$-alkyl; aryl or hetaryl, each of which may be substituted by C$_1$-C$_8$-alkyl, C$_1$-C$_6$-alkoxy, halogen, hydroxyl and/or cyano; both R$^3$ radicals may be joined to give a 5- to 7-membered heterocyclic radical which contains the nitrogen atom and is bonded via it;
n is 2, 3 or 4;
m is from 0 to 6, which comprises
a) reacting a rylene derivative monobrominated in the peri-position of the general formula II'

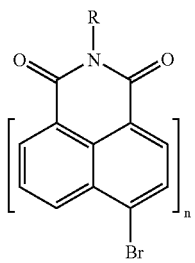

with 1-aminoanthraquinone in a cross-coupling reaction in the presence of an aprotic organic solvent, of a transition metal catalyst system and of a base, b) cyclizing the rylenanthramine formed in step a) of the general formula III'

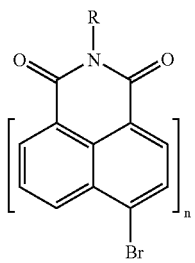

in the presence of a polar organic solvent and of a base to give the rylene dye of the formula I' which is unsubstituted in the rylene core and where m is 0, and c) if desired, converting the rylene dye I' unsubstituted in the rylene core and obtained in step b) to the rylene dye of the formula I' brominated in the rylene core where R' is bromine and m does not equal 0 by reacting with elemental bromine, and d) if desired, converting the rylene dye I' brominated in the rylene core and obtained in step c)

d1) by reacting with a compound of the general formula IV

where Z is sulfur or oxygen and the ring A is an aryl or hetaryl radical, each of which may be mono- or polysubstituted by C$_1$-C$_{12}$-alkyl, C$_1$-C$_{12}$-alkoxy, cyano, —CONHR$^2$ and/or —NHCOR$^2$, in the presence of an inert nitrogen-basic organic solvent and of a base to give the rylene dye of the formula I' which is substituted in the rylene core and where R' is aryloxy, arylthio, hetaryloxy or hetarylthio, each of which may be mono- or polysubstituted by $C_1$-$C_{12}$-alkyl, $C_1$-$C_{12}$-alkoxy, cyano, —CONHR$^2$ and/or —NHCOR$^2$, and m does not equal 0, d2) by reacting with copper(I) cyanide in the presence of a dipolar aprotic organic solvent to give the rylene dye of the formula I' which is substituted in the rylene core and where R' is cyano and m does not equal 0, d3) by reacting with an alkyne of the general formula V

   V where R" is a $C_1$-$C_{16}$-alkyl radical which may be interrupted by one or more —O—, —S—, —NR$^1$—, —CO— and/or —SO$_2$— moieties and may be mono- or polysubtituted by —COOR$^1$, —SO$_3$R$^1$, hydroxyl, cyano, $C_1$-$C_6$-alkoxy, $C_5$-$C_8$-cycloalkyl, aryl and/or a 5- to 7-membered heterocyclic radical which is bonded via a nitrogen atom and may contain further heteroatoms and be aromatic, in the presence of an aprotic organic solvent, of a palladium complex as a catalyst, of a copper salt as a cocatalyst and of a base to give the rylene dye of the formula I' which is substituted in the rylene core and where R' is —C≡C—R" and m does not equal 0, or d4) by reacting with ammonia or an amine of the general formula VI

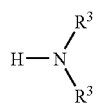   VI in the presence of a dipolar aprotic organic solvent to give the rylene dye of the formula I' which is substituted in the rylene core and where R' is —NR$^3{}_2$ and m does not equal 0.

A process has also been found for preparing symmetrical rylene dyes of the general formula I"

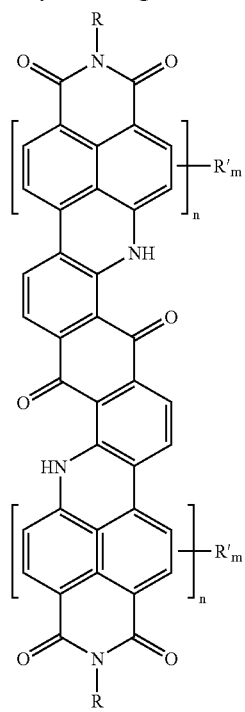   I"

where the variables R, R', R$^1$, R$^2$, R$^3$ and m are each as defined for the formula I' and n is equal to 1, 2, 3 or 4, which comprises a) reacting a rylene derivative monobrominated in the peri-position of the general formula II'

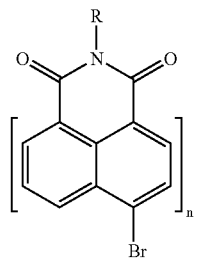   II' with 1,5-diaminoanthraquinone in a double cross-coupling reaction in the presence of an aprotic organic solvent, of a transition metal catalyst system and of a base, b) cyclizing the rylenanthramine formed in step a) of the general formula III"

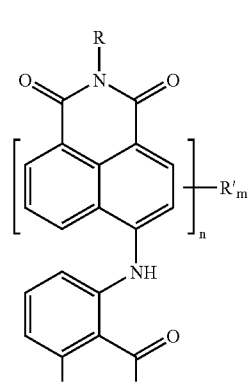   III"

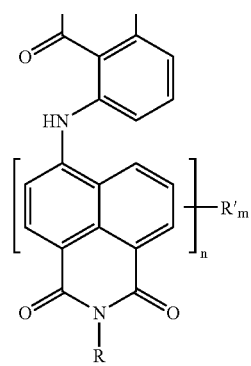

in the presence of a polar organic solvent and of a base to give the rylene dye of the formula I" where m is 0, and c) if desired, converting the rylene dye I' unsubstituted in the rylene core and obtained in step b) to the rylene dye of the formula I" brominated in the rylene core where R' is bromine and m is equal to 0 by reacting with elemental bromine and d) if desired, converting the rylene dye I" brominated in the rylene core and obtained in step c)

d1) by reacting with a compound of the general formula IV

IV where Z is sulfur or oxygen and the ring A is an aryl or hetaryl radical, each of which may be mono- or polysubstituted by $C_1$-$C_{12}$-alkyl, $C_1$-$C_{12}$-alkoxy, cyano, —$CONHR^2$ and/or —$NHCOR^2$, in the presence of an inert nitrogen-basic organic solvent and of a base to give the rylene dye of the formula I″ which is substituted in the rylene core and where R′ is aryloxy, arylthio, hetaryloxy or hetarylthio, each of which may be mono- or polysubstituted by $C_1$-$C_{12}$-alkyl, $C_1$-$C_{12}$-alkoxy, cyano, —$CONHR^2$ and/or —$NHCOR^2$, and m does not equal 0, d2) by reacting with copper(I) cyanide in the presence of a dipolar aprotic organic solvent to give the rylene dye of the formula I″ which is substituted in the rylene core and where R′ is cyano and m does not equal 0, d3) by reacting with an alkyne of the general formula V

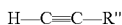
V where R″ is a $C_1$-$C_{16}$-alkyl radical which may be interrupted by one or more —O—, —S—, —$NR^1$—, —CO— and/or —$SO_2$— moieties and may be mono- or polysubstituted by —$COOR^1$, —$SO_3R^1$, hydroxyl, cyano, $C_1$-$C_6$-alkoxy, $C_5$-$C_8$-cycloalkyl, aryl and/or a 5- to 7-membered heterocyclic radical which is bonded via a nitrogen atom and may contain further heteroatoms and be aromatic, in the presence of an aprotic organic solvent, of a palladium complex as a catalyst, of a copper salt as a cocatalyst and of a base to give the rylene dye of the formula I″ which is substituted in the rylene core and where R′ is —C≡C—R″ and m does not equal 0, or d4) by reacting with ammonia or an amine of the general formula VI

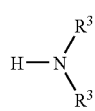
VI in the presence of a dipolar aprotic organic solvent to give the rylene dye of the formula I″ which is substituted in the rylene core and where R′ is —$NR^3{}_2$ and m does not equal 0.

A process has also been found for preparing nonsymmetrical rylene dyes of the general formula I‴

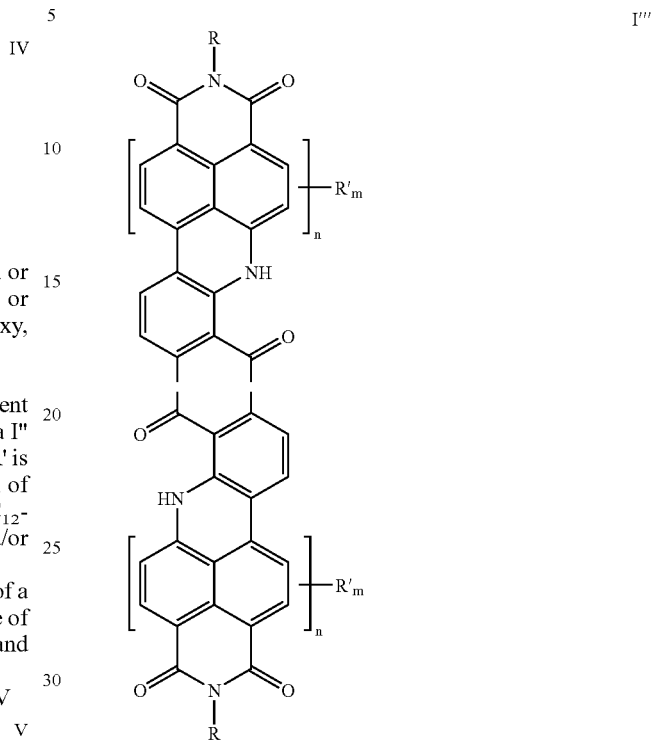
I‴ where the variables R, R′, $R^1$, $R^2$, $R^3$ and m are each as defined for the formula I′, and n and n′ are each equal to 1, 2, 3 or 4, although n≠n′, which comprises a1) initially reacting a rylene derivative monobrominated in the peri-position of the general formula II′

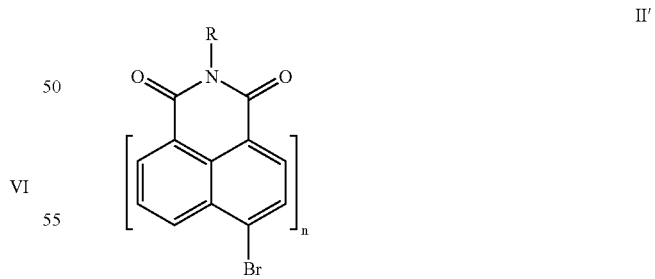
II′ with excess 1,5-diaminoanthraquinone in a first cross-coupling reaction in the presence of an aprotic organic solvent, of a transition metal catalyst system and of a base, a2) reacting the aminorylenanthramine obtained in step a) of the general formula IIIa

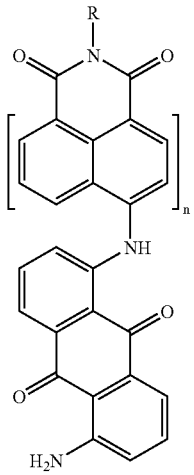

IIIa with a rylene derivative monobrominated in the peri-position of the general formula II''

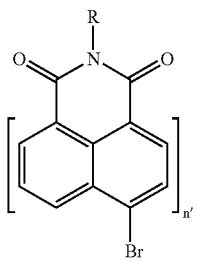

II'' in the presence of an aprotic organic solvent, of a transition metal catalyst and of a base in a second cross-coupling reaction, b) cyclizing the rylenanthramine formed in step a) of the general formula III'''

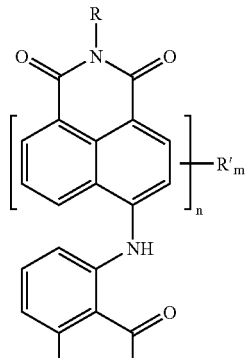

III'''

-continued

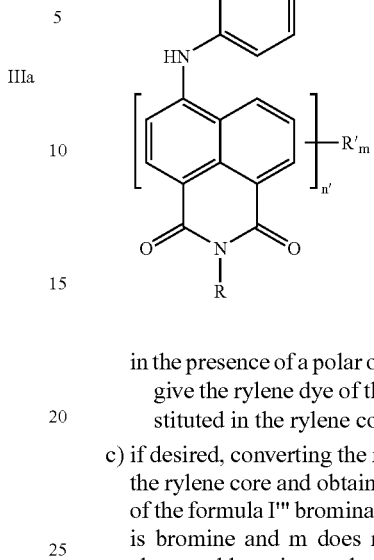

in the presence of a polar organic solvent and of a base to give the rylene dye of the formula I''' which is unsubstituted in the rylene core and where m is 0, and c) if desired, converting the rylene dye I''' unsubstituted in the rylene core and obtained in step b) to the rylene dye of the formula I''' brominated in the rylene core where R' is bromine and m does not equal 0 by reacting with elemental bromine, and d) if desired, converting the rylene dye I''' brominated in the rylene core and obtained in step c)

d1) by reacting with a compound of the general formula IV

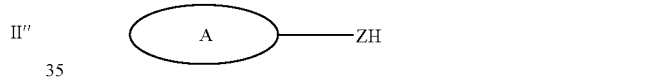

IV where Z is sulfur or oxygen and the ring A is an aryl or hetaryl radical, each of which may be mono- or polysubstituted by $C_1$-$C_{12}$-alkyl, $C_1$-$C_{12}$-alkoxy, cyano, —$CONHR^2$ and/or —$NHCOR^2$, in the presence of an inert nitrogen-basic organic solvent and of a base to give the rylene dye of the formula I''' which is substituted in the rylene core and where R' is aryloxy, arylthio, hetaryloxy or hetarylthio, each of which may be mono- or polysubstituted by $C_1$-$C_{12}$-alkyl, $C_1$-$C_{12}$-alkoxy, cyano, —$CONHR^2$ and/or —$NHCOR^2$, and m does not equal 0, d2) by reacting with copper(I) cyanide in the presence of a dipolar aprotic organic solvent to give the rylene dye of the formula I''' which is substituted in the rylene core and where R' is cyano and m does not equal 0, d3) by reacting with an alkyne of the general formula V

V where R'' is a $C_1$-$C_{16}$-alkyl radical which may be interrupted by one or more —O—, —S—, —$NR^1$—, —CO— and/or —$SO_2$— moieties and may be mono- or polysubstituted by —$COOR^1$, —$SO_3R^1$, hydroxyl, cyano, $C_1$-$C_6$-alkoxy, $C_5$-$C_8$-cycloalkyl, aryl and/or a 5- to 7-membered heterocyclic radical which is bonded via a nitrogen atom and may contain further heteroatoms and be aromatic, in the presence of an aprotic organic solvent, of a palladium complex as a catalyst, of a copper salt as a cocatalyst and of a base to give the rylene dye of the formula I''' which is substituted in the rylene core and where R' is —C≡C—R'' and m does not equal 0, or d4) by reacting with ammonia or an amine of the general formula VI

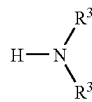

in the presence of a dipolar aprotic organic solvent to give the rylene dye of the formula I''' which is substituted in the rylene core and where R' is —NR$^3$$_2$ and m does not equal 0.

Not least, the applications of the rylene dyes I mentioned at the outset were also found.

All alkyl groups occurring in the formulae I to V may be straight-chain or branched. When the alkyl groups are substituted, they generally bear 1 or 2 substituents.

The specific examples of suitable R, R$^1$, R$^2$, R$^3$, R' and R'' radicals (and of their substituents) are as follows:

methyl, ethyl, propyl, isopropyl, butyl, isobutyl, tert-butyl, pentyl, isopentyl, neopentyl, tert-pentyl, hexyl, 2-methylpentyl, heptyl, 1-ethylpentyl, octyl, 2-ethylhexyl, isooctyl, nonyl, isononyl, decyl, isodecyl, undecyl, dodecyl, tridecyl, isotridecyl, tetradecyl, pentadecyl, hexadecyl, heptadecyl, octadecyl, nonadecyl and eicosyl (the above terms isooctyl, isononyl, isodecyl and isotridecyl are trivial names and stem from the alcohols obtained by the oxo process); 2-methoxyethyl, 2-ethoxyethyl, 2-propoxyethyl, 2-isopropoxyethyl, 2-butoxyethyl, 2- and 3-methoxypropyl, 2- and 3-ethoxypropyl, 2- and 3-propoxypropyl, 2- und 3-butoxypropyl, 2- and 4-methoxybutyl, 2- and 4-ethoxybutyl, 2- and 4-propoxybutyl, 3,6-dioxaheptyl, 3,6-dioxaoctyl, 4,8-dioxanonyl, 3,7-dioxaoctyl, 3,7-dioxanonyl, 4,7-dioxaoctyl, 4,7-dioxanonyl, 2- and 4-butoxybutyl, 4,8-dioxadecyl, 3,6,9-trioxadecyl, 3,6,9-trioxaundecyl, 3,6,9-trioxadodecyl, 3,6,9,12-tetraoxatridecyl and 3,6,9,12-tetraoxatetradecyl;

2-methylthioethyl, 2-ethylthioethyl, 2-propylthioethyl, 2-isopropylthioethyl, 2-butylthioethyl, 2- and 3-methylthiopropyl, 2- and 3-ethylthiopropyl, 2- and 3-propylthiopropyl, 2- and 3-butylthiopropyl, 2- and 4-methylthiobutyl, 2- and 4-ethylthiobutyl, 2- and 4-propylthiobutyl, 3,6-dithiaheptyl, 3,6-dithiaoctyl, 4,8-dithianonyl, 3,7-dithiaoctyl, 3,7-dithianonyl, 2- and 4-butylthiobutyl, 4,8-dithiadecyl, 3,6,9-trithiadecyl, 3,6,9-trithiaundecyl, 3,6,9-trithiadodecyl, 3,6,9,12-tetrathiatridecyl and 3,6,9,12-tetrathiatetradecyl;

2-monomethyl- and 2-monoethylaminoethyl, 2-dimethylaminoethyl, 2- and 3-dimethylaminopropyl, 3-monoisopropylaminopropyl, 2- and 4-monopropylaminobutyl, 2- and 4-dimethylaminobutyl, 6-methyl-3,6-diazaheptyl, 3,6-dimethyl-3,6-diazaheptyl, 3,6-diazaoctyl, 3,6-dimethyl-3,6-diazaoctyl, 9-methyl-3,6,9-triazadecyl, 3,6,9-trimethyl-3,6,9-triazadecyl, 3,6,9-triazaundecyl, 3,6,9-trimethyl-3,6,9-triazaundecyl, 12-methyl-3,6,9,12-tetraazatridecyl and 3,6,9,12-tetramethyl-3,6,9,12-tetraazatridecyl;

propan-2-on-1-yl, butan-3-on-1-yl, butan-3-on-2-yl and 2-ethylpentan-3-on-1-yl;

2-methylsulfonylethyl, 2-ethylsulfonylethyl, 2-propylsulfonylethyl, 2-isopropylsulfonylethyl, 2-butylsulfonylethyl, 2- and 3-methylsulfonylpropyl, 2- and 3-ethylsulfonylpropyl, 2- and 3-propylsulfonylpropyl, 2- and 3-butylsulfonylpropyl, 2- and 4-methylsulfonylbutyl, 2- and 4-ethylsulfonylbutyl, 2- and 4-propylsulfonylbutyl and 4-butylsulfonylbutyl;

carboxymethyl, 2-carboxyethyl, 3-carboxypropyl, 4-carboxybutyl, 5-carboxypentyl, 6-carboxyhexyl, 8-carboxyoctyl, 10-carboxydecyl, 12-carboxydodecyl and 14-carboxytetradecyl;

sulfomethyl, 2-sulfoethyl, 3-sulfopropyl, 4-sulfobutyl, 5-sulfopentyl, 6-sulfohexyl, 8-sulfooctyl, 10-sulfodecyl, 12-sulfododecyl and 14-sulfotetradecyl;

2-hydroxyethyl, 3-hydroxypropyl, 1-hydroxyprop-2-yl, 2- and 4-hydroxybutyl, 1-hydroxybut-2-yl and 8-hydroxy-4-oxaoctyl;

cyanomethyl, 2-cyanoethyl, 3-cyanopropyl, 2-methyl-3-ethyl-3-cyanopropyl, 7-cyano-7-ethylheptyl and 4,7-dimethyl-7-cyanoheptyl;

methoxy, ethoxy, propoxy, isopropoxy, butoxy, isobutoxy, sec-butoxy, tert-butoxy, pentoxy, isopentoxy, neopentoxy, tert-pentoxy and hexoxy;

carbamoyl, methylaminocarbonyl, ethylaminocarbonyl, propylaminocarbonyl, butylaminocarbonyl, pentylaminocarbonyl, hexylaminocarbonyl, heptylaminocarbonyl, octylaminocarbonyl, nonylaminocarbonyl, decylaminocarbonyl and phenylaminocarbonyl;

formylamino, acetylamino, propionylamino and benzoylamino;

chlorine, bromine and iodine;

amino, dimethylamino, diethylamino, dipropylamino, dibutylamino, dipentylamino, dihexylamino, diheptylamino, dioctylamino, dinonylamino, didecylamino, N-piperidinyl and N-pyrrolidinyl;

phenylazo, 2-napthylazo, 2-pyridylazo and 2-pyrimidylazo;

phenyl, 2-naphthyl, 2- and 3-pyrryl, 2-, 3- and 4-pyridyl, 2-, 4- and 5-pyrimidyl, 3-, 4- and 5-pyrazolyl, 2-, 4- and 5-imidazolyl, 2-, 4- and 5-thiazolyl, 3-(1,2,4-triazyl), 2-(1,3,5-triazyl), 6-quinaldyl, 3-, 5-, 6- and 8-quinolinyl, 2-benzoxazolyl, 2-benzothiazolyl, 5-benzothiadiazolyl, 2- and 5-benzimidazolyl and 1- and 5-isoquinolyl;

2-, 3- and 4-methylphenyl, 2,4-, 2,5-, 3,5- and 2,6-dimethylphenyl, 2,4,6-trimethylphenyl, 2-, 3- and 4-ethylphenyl, 2,4-, 2,5-, 3,5- and 2,6-diethylphenyl, 2,4,6-triethylphenyl, 2-, 3- and 4-propylphenyl, 2,4-, 2,5-, 3,5- and 2,6-dipropylphenyl, 2,4,6-tripropylphenyl, 2-, 3- and 4-isopropylphenyl, 2,4-, 2,5-, 3,5- and 2,6-diisopropylphenyl, 2,4,6-triisopropylphenyl, 2-, 3- and 4-butylphenyl, 2,4-, 2,5-, 3,5- and 2,6-dibutylphenyl, 2,4,6-tributylphenyl, 2-, 3- and 4-isobutylphenyl, 2,4-, 2,5-, 3,5- and 2,6-diisobutylphenyl, 2,4,6-triisobutylphenyl, 2-, 3- and 4-sec-butylphenyl, 2,4-, 2,5-, 3,5- and 2,6-di-sec-butylphenyl and 2,4,6-tri-sec-butylphenyl, 2-, 3- and 4-tert-butylphenyl, 2,4-, 2,5-, 3,5- and 2,6-di-tert-butylphenyl, 2,4,6-tri-tert-butylphenyl; 2-, 3- and 4-methoxyphenyl, 2,4-, 2,5-, 3,5- and 2,6-dimethoxyphenyl, 2,4,6-trimethoxyphenyl, 2-, 3- and 4-ethoxyphenyl, 2,4-, 2,5-, 3,5- and 2,6-diethoxyphenyl, 2,4,6-triethoxyphenyl, 2-, 3- and 4-propoxyphenyl, 2,4-, 2,5-, 3,5- and 2,6-dipropoxyphenyl, 2-, 3- and 4-isopropoxyphenyl, 2,4-, 2,5-, 3,5- and 2,6-diisopropoxyphenyl and 2-, 3- and 4-butoxyphenyl; 2-, 3- and 4-chlorophenyl, and 2,4-, 2,5-, 3,5- and 2,6-dichlorophenyl; 2-, 3- and 4-hydroxyphenyl and 2,4-, 2,5-, 3,5- and 2,6-dihydroxyphenyl; 2-, 3- and 4-cyanophenyl; 3- and 4-carboxyphenyl; 3- and 4-carboxamidophenyl, 3- and 4-N-methylcarboxamidophenyl and 3- and 4-N-ethylcarboxamidophenyl; 3- and 4-acetylaminophenyl, 3- and 4-propionylaminophenyl and 3- and 4-butyrylaminophenyl; 3- and 4-N-phenylaminophenyl, 3- and 4-N-(o-tolyl)aminophenyl, 3- and 4-N-(m-tolyl)aminophenyl and 3- and 4-N-

(p-tolyl)aminophenyl; 3- and 4-(2-pyridyl)aminophenyl, 3- and 4-(3-pyridyl)aminophenyl, 3- and 4-(4-pyridyl)aminophenyl, 3- and 4-(2-pyrimidyl)aminophenyl and 4-(4-pyrimidyl)aminophenyl;

4-phenylazophenyl, 4-(1-naphthylazo)phenyl, 4-(2-naphthylazo)-phenyl, 4-(4-naphthylazo)phenyl, 4-(2-pyridylazo) phenyl, 4-(3-pyridylazo)phenyl, 4-(4-pyridylazo)phenyl, 4-(2-pyrimidylazo)phenyl, 4-(4-pyrimidylazo)phenyl and 4-(5-pyrimidylazo)-phenyl;

cyclopentyl, 2- and 3-methylcyclopentyl, 2- and 3-ethyl-cyclopentyl, cyclohexyl, 2-, 3- and 4-methylcyclohexyl, 2-, 3- and 4-ethylcyclohexyl, 3- and 4-propylcyclohexyl, 3- and 4-isopropylcyclohexyl, 3- and 4-butylcyclohexyl, 3- and 4-sec-butylcyclohexyl, 3- and 4-tert-butylcyclohexyl, cycloheptyl, 2-, 3- and 4-methylcycloheptyl, 2-, 3- and 4-ethylcycloheptyl, 3- and 4-propylcycloheptyl, 3- and 4-isopropylcycloheptyl, 3- and 4-butylcycloheptyl, 3- and 4-sec-butylcycloheptyl, 3- and 4-tert-butylcycloheptyl, cyclooctyl, 2-, 3-, 4- and 5-methylcyclooctyl, 2-, 3-, 4- and 5-ethylcyclooctyl, 3-, 4- and 5-propylcyclooctyl, 2-dioxanyl, 4-morpholinyl, 2- and 3-tetrahydrofuryl, 1-, 2- and 3-pyrrolidinyl and 1-, 2-, 3- and 4-piperidyl;

phenoxy, phenylthio, 2-naphthyloxy, 2-naphthylthio, 2-, 3- and 4-pyridyloxy, 2-, 3- and 4-pyridylthio, 2-, 4- and 5-pyrimidyloxy and 2-, 4- and 5-pyrimidylthio.

Examples of particularly preferred R' radicals are bromine and also p-tert-butylphenoxy, p-(1,1-dimethylpropyl)phenoxy, p-(1,1-dimethylbutyl)phenoxy, p-(1,1-dimethylpentyl)phenoxy, p-(1,1,3,3-tetramethylbutyl)phenoxy, p-(2-cyclopentyl-1,1-dimethylethyl)phenoxy, p-(2-cyclohexyl-1,1-dimethylethyl)phenoxy, p-(2-cycloheptyl-1,1-dimethylethyl)phenoxy and p-(1,1-dimethyl-2-(4-morpholinyl)ethyl)phenoxy.

The rylene dyes I (I', I" and I''') can advantageously be prepared by the multistage processes according to the invention starting from the rylene derivative II' monobrominated in the peri-position.

To prepare the rylene dyes I' in step a), II' is reacted with 1-aminoanthraquinone in a cross-coupling reaction to give the rylenanthramine III' or, to prepare the symmetrical rylene dyes I", with 1,5-diaminoanthraquinone to give the rylenanthramine III". In the preparation of the nonsymmetrical rylene dyes III''', step a) is carried out in two stages by initially reacting the monobrominated rylene derivative II' with excess 1,5-diaminoanthraquinone (step a1)) and reacting the resultant aminorylenanthramine IIIa with another monobrominated rylene derivative II" to give the rylenanthramine III''' (step a2)).

The rylenanthramines III', III" and III''' (summarized hereinbelow as rylenanthramines III) are subsequently subjected in step b) to a cyclization to give the rylene dyes I unsubstituted in the rylene core (m=0).

Rylene dyes I brominated in the rylene core (R'=Br, m≠0) can be obtained in a subsequent step c) by reaction with elemental bromine.

The further rylene dyes I substituted in the rylene core are obtainable from the brominated rylene dyes I by bromine exchange in step d). For instance, rylene dyes I which are substituted by (het)aryloxy and (het)arylthio, cyano, alkynyl radicals R' or amino radicals R' can be prepared by reaction with a (het)aromatic (thio)alcohol IV (step d1)), copper(I) cyanide (step d2)), a 1-alkyne V (step d3)) or ammonia or a primary or secondary amine VI (step d4).

The naphthalene-1,8- or perylene-3,4-di-carboxamides monobrominated in the peri-position which are used as reactants in step a) are disclosed by WO-A-01/16109. The terrylene- or quaterrylene-3,4-dicarboxamides monobrominated in the peri-position which are used as reactants are disclosed by DE-A-101 08 156, unpublished at the priority date of the present invention, and can be prepared by the following three-stage process described there:

A) alkaline hydrolysis, on one side, of an asymmetric rylenetetracarboxylic diimide of the formula VII

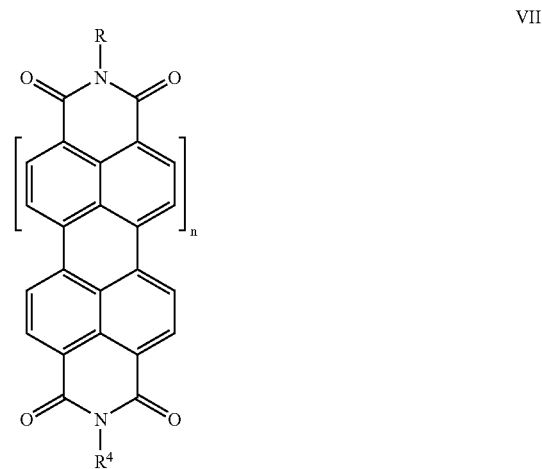

VII where $R^4$ is $C_5$-$C_8$-cycloalkyl whose carbon framework may be interrupted by one or more —O—, —S— and/or —$NR^2$— moieties and which may be mono- or polysubstituted by $C_1$-$C_6$-alkyl, and n is 2 or 3, in the presence of a polar organic solvent, B) decarboxylation, on one side, of the rylenetetracarboxylic monoimide monoanhydride formed in step A) of the formula VIII

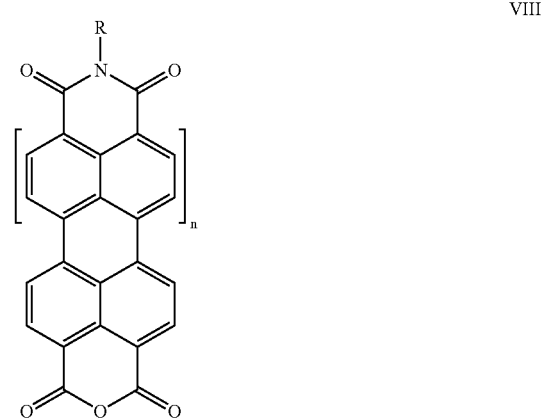

VIII in the presence of a tertiary nitrogen-basic compound and of a transition metal catalyst and C) reaction of the rylene-3,4-dicarboximide unsubstituted in the 20 peri-position of the formula IX

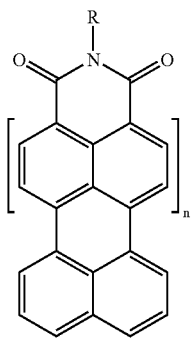

IX with elemental bromine.

Polar solvents suitable for step A) of this process are in particular branched $C_3$-$C_6$-alcohols, such as isopropanol, tert-butanol and 2-methyl-2-butanol.

In general, from 40 to 200 g of solvent are used per gram of VII.

Suitable bases are inorganic bases, in particular alkali metal and alkaline earth metal hydroxides, e.g. sodium hydroxide and potassium hydroxide, which are preferably used in the form of aqueous solutions or suspensions (generally from 50 to 80% by weight), and organic bases, in particular alkali metal and alkaline earth metal alkoxides, although preference is given to using sodium alkoxides and potassium alkoxides, such as sodium methoxide, potassium methoxide, potassium isopropoxide and potassium tert-butoxide, which are typically used in anhydrous form.

In general, from 5 to 50 equivalents of base, based on VII, are required.

The reaction temperature is generally from 50 to 120° C., preferably from 60 to 100° C.

The hydrolysis is complete typically within from 10 to 40 h.

In step B) of this process, the rylenetetracarboxylic monoimide monoanhydrides VIII are decarboxylated on one side in the presence of a tertiary nitrogen-basic compound as a solvent and of a transition metal catalyst.

Suitable solvents are in particular high-boiling nitrogen bases, for example cyclic amides such as N-methylpyrrolidone, and aromatic heterocycles such as quinoline, isoquinoline and quinaldine.

Typical amounts of solvent are from 20 to 150 g per gram of VII.

Suitable catalysts are in particular the transition metals copper and zinc and also particularly their inorganic and organic salts which are preferably used in anhydrous form.

Examples of preferred salts are copper(I) oxide, copper(II) oxide, copper(I) chloride, copper(II) acetate, zinc acetate and zinc propionate, and particular preference is given to copper (I) oxide and zinc acetate.

It will be appreciated that mixtures of the catalysts mentioned can also be used.

In general, from 50 to 90 mol % of catalyst is used, based on VIII.

The reaction temperature is generally from 100 to 250° C., in particular from 160 to 200° C. It is recommended to work with the use of a protective gas atmosphere (for example nitrogen).

Typically, the decarboxylation is complete within from 3 to 20 h.

Step C) of this process, the regioselective bromination of the rylene-3,4-dicarboximide IX, is preferably carried out in an aliphatic monocarboxylic acid, in particular a $C_1$-$C_4$-carboxylic acid, such as formic acid, acetic acid, propionic acid, butyric acid or mixtures thereof, or in a halogenated, aliphatic or aromatic solvent, such as methylene chloride, chloroform or chlorobenzene.

Typically, from 5 to 30 g, preferably from 15 to 25 g, of solvent are used per gram of IX to be brominated.

In general, the presence of a halogenation catalyst is not required. However, if acceleration of the bromination reaction is desired (by a factor from about 1.5 to 2), it is recommended to add elemental iodine, preferably in an amount of from 1 to 5 mol %, based on IX.

In general, the molar ratio of bromine to IX is from about 1:1 to 5:1, preferably from 3:1 to 4:1.

The reaction temperature is from 0 to 70° C., in particular from 10 to 40° C.

Depending on the reactivity of the substrate IX and the presence or absence of iodine, the bromination is complete typically within from 2 to 12 h.

Step a) of the processes according to the invention, the cross-coupling of the rylene derivatives II' with 1-aminoanthraquinone or 1,5-diaminoanthraquinone, is carried out in the presence of an aprotic organic solvent, of a transition metal catalyst system and of a base.

Particularly suitable aprotic organic solvents are anhydrous inert aromatic solvents such as benzene and its alkylation products, for example toluene and o-, m- and p-xylene, and also aliphatic and cycloaliphatic ethers such as dimethoxyethane, 1,4-dioxane and tetrahydrofuran.

The amount of solvent is typically from 60 to 380 g, preferably from 120 to 150 g, per gram of II'.

Suitable transition metal catalysts are in particular palladium compounds, and preferred examples are palladium(0) and palladium(II) complexes, such as tris(dibenzylidenacetone)-dipalladium(0), dichloro[1,1'-bis(diphenylphosphino)ferrocene]-palladium(II) and dichloro(1,5-cyclooctadiene)palladium(II), and palladium(II) acetate.

Typically, the transition metal catalyst is used in an amount of from 0.4 to 5 mol %, in particular from 1 to 3 mol %, based on II'.

Preference is given to additionally using a cocatalyst based on phosphine. Preferred examples of this cocatalyst are bidentate phosphine ligands, such as racemic 2,2'-bis(diphenylphosphino)-1,1'-binaphthyl, 1,1'-bis(diphenylphosphino) ferrocene, 1,1'-bis-(di-o-tolylphosphino)ferrocene, 1,1'-bis (di-p-methoxyphenylphosphino)ferrocene and 2,2'-bis(di-o-tolylphosphino)diphenyl ether, and phosphines acting as monodentate phosphine ligands, such as tri-o-tolylphosphine, tri-tert-butylphosphine and triphenylphosphine.

Suitable amounts of cocatalyst are generally from 1 to 10 mol %, preferably from 1 to 5 mol %, based on II'.

Particularly suitable bases are alkali metal amides, in particular alkali metal di($C_3$-$C_6$-alkyl)amides, and alkali metal alkoxides, in particular the alkali metal salts of secondary and tertiary aliphatic ($C_3$-$C_6$—)alcohols. Preferred examples of these bases are: lithium diisopropylamide, sodium diisopropylamide and potassium diisopropylamide, and also lithium isopropoxide, sodium isopropoxide, potassium isopropoxide, lithium tert-butoxide, sodium tert-butoxide and potassium tert-butoxide, and particular preference is given to sodium tert-butoxide and potassium tert-butoxide.

In general, an at least equimolar amount of base, preferably 1.1 mol of base per mole of II', is used.

For the preparation of the rylene dyes I', 1-aminoanthraquinone and rylene derivative II' are generally used in a molar ratio of from 0.8:1 to 1:1. For the preparation of the symmetrical rylene dyes I", a particularly suitable molar ratio of 1,5-diaminoanthraquinone to rylene derivative II' is generally from 0.4:1 to 0.5:1.

The reaction temperature is typically from 50 to 120° C., preferably from 70 to 100° C.

It is recommended to work under a protective gas atmosphere.

Depending on the reactivity of the rylene derivatives II' and the amount of catalyst used, the reaction time is generally from 6 to 40 h, in particualr from 18 to 24 h.

In the preparation of the nonsymmetrical rylene dyes I''', the procedure in the partial steps a1) and a2) is in each case similar to step a). In step a1), only the molar ratio of 1,5-diaminoanthraquinone to rylene derivative II' is adjusted, preferably to from 1:0.3 to 1:0.8, and, similarly to step a), the molar ratio of aminorylenanthramine IIIa to rylene derivative II" in step a2) is from 0.8:1 to 1:1.

In terms of method, the procedure in the steps a) is advantageously as follows:

solvent, catalyst and cocatalyst are initially charged in a protective gas atmosphere, the rylene derivative II' or II", 1-aminoanthraquinone or 1,5-diaminoanthraquinone or aminorylenanthramine IIIa and base are added in succession with stirring and the mixture is heated under protective gas to the desired reaction temperature for from 6 to 24 h. After cooling to room temperature, the solid constituents are filtered out of the reaction mixture, washed with a polar organic solvent, for example ethanol, and subsequently with water. If desired, the filtered material can additionally be stirred in a dilute mineral acid, for example in sulfuric acid, and finally washed to neutrality with water.

The purification of the rylenanthramines III prepared in this way is generally sufficient for further processing. Optionally, the crude product can be further purified by reprecipitation from chloroform, methylene chloride/petroleum ether or N-methylpyrrolidone, or by column chromatography on silica gel using a methylene chloride/tetrahydrofuran mixture as the eluent.

Step b) of the processes according to the invention, the cyclization of the rylenanthramines III to give the rylene dyes I unsubstituted in the rylene core, is carried out in the presence of a polar organic solvent and of a base.

Suitable for this purpose are in particular high-boiling, oxygen or nitrogen solvents, for example ethers such as diphenyl ether, diethylene glycol dimethyl and diethyl ether, polyhydric alcohols such as diethylene glycol, amino alcohols such as aminoethanol, carboxamides such as dimethylformamide and dimethylacetamide, N-methylpyrrolidone and tertiary nitrogen bases such as 1,5-diazabicyclo[4.3.0]non-3-ene and 1,8-diazabicyclo[5.4.0]undec-7-ene.

In general, from 10 to 50 g, preferably from 20 to 30 g, of solvent are used per gram of III.

Suitable bases are inorganic bases, in particular alkali metal and alkaline earth metal hydroxides, such as sodium hydroxide and potassium hydroxide, and alkali metal and alkaline earth metal carbonates, such as sodium carbonate, potassium carbonate and cesium carbonate, and also organic bases, in particular alkali metal and alkaline earth metal alkoxides, and preference is given to sodium alkoxides and potassium alkoxides, such as sodium methoxide, potassium methoxide, potassium isopropoxide and potassium tert-butoxide, and alkali metal amides, such as lithium diisopropylamide, sodium diisopropylamide and potassium diisopropylamide, which are typically used in anhydrous form.

In general, from 3 to 30, in particular from 8 to 10, molar equivalents of base, based on III, are used.

The reaction temperature is typically from 50 to 180° C., preferably from 90 to 120° C.

It is advantageous to work under a protective gas atmosphere.

Depending on the reactivity of the rylenanthramines III, the reaction time is generally from 2 to 80 h.

In terms of method, the procedure in step b) is advantageously as follows:

anhydrous solvent and base are initially charged in a protective gas atmosphere, the mixture is heated to the desired reaction temperature, and the rylenanthramine III, if desired in the form of a solution or suspension in very little further solvent, is added. After a reaction time of from 2 to 80 h, the reaction mixture is cooled to 50-60° C., and an amount of low-boiling alcohol, e.g. methanol or ethanol, equivalent to the volume of solvent is added, and the mixture is allowed to cool with stirring. Subsequently, the pH is adjusted to 6 by adding an acid, for example 50% by weight acetic acid, and the reaction product is filtered off, washed with hot water and dried under reduced pressure at about 100° C.

If desired, the unsubstituted rylene dyes I obtained can be further purified by extraction with a solvent such as tetrahydrofuran.

5 When rylene dyes I (I', I" or I''') are to be prepared which are brominated in the rylene core, the unsubstituted rylene dyes I of step c) of the processes according to the invention are reacted with elemental bromine.

Suitable solvents are in particular aliphatic monocarboxylic acids which preferably have from 1 to 4 carbon atoms, such as formic acid, acetic acid, propionic acid and butyric acid, and also mixtures thereof, and halogenated aliphatic or aromatic hydrocarbons, such as methylene chloride, chloroform and chlorobenzene.

Typically, from 50 to 300 g, preferably from 70 to 100 g, of solvent are used per gram of rylene dye I to be brominated.

The molar ratio of bromine to rylene dye I depends on the desired degree of bromination. In general, for each bromine atom to be introduced, from 1.1 to 3 mol of I are used.

In general, the presence of a halogenation catalyst is not required. However, if acceleration of the bromination reaction is desired (by a factor of from about 1.5 to 3), it is recommended to add elemental iodine, preferably in an amount of from 1 to 5 mol %, based on I.

The reaction temperature is generally from 0 to 70° C., preferably from 10 to 40° C.

Depending on the reactivity of the rylene dye I to be brominated and the presence or absence of iodine, the bromination is complete typically within from 2 to 24 h.

In terms of method, the procedure in step c) is advantageously as follows:

the solvent and rylene dye I are initially charged and the mixture is adjusted to the desired reaction temperature with stirring within from 15 to 30 min, any catalyst and subsequently, within from 5 to 10 min, the desired amount of bromine are added and the mixture is stirred with the exclusion of light at the reaction temperature for from 2 to 24 h. After excess bromine is removed using a vigorous nitrogen stream, the reaction mixture is introduced into about the same amount of an aliphatic alcohol, such as methanol, and stirred overnight, the precipitated product is filtered off, washed preferably with the same alcohol and with water, and dried under reduced pressure at about 120° C.

Typically, the brominated rylene dyes I prepared in this way are purified before subsequent reactions by column chromatography on silica gel using chloroform as the eluent or by extraction with a solvent, such as ethanol.

Rylene dyes I which are substituted in the rylene core by optionally alkyl- or alkoxy-substituted aryloxy, arylthio, hetaryloxy or hetarylthio can be prepared in step d1) of the processes according to the invention by reaction of the brominated rylene dyes I with an aromatic or heteroaromatic alcohol or thioalcohol IV in the presence of an inert nitrogen-basic organic solvent and of a base.

Suitable inert nitrogen-basic solvents for this purpose are especially polar solvents, in particular nitrogen heterocycles, such as pyridine, pyrimidine, quinoline, isoquinoline, quinaldine and preferably N-methylpyrrolidone, and also carboxamides such as N,N-dimethylformamide and N,N-dimethylacetamide.

Depending on the solubility of the brominated rylene dye I, the amount of solvent is typically from 2 to 40 g, preferably from 4 to 25 g, per gram of brominated rylene dye I.

Suitable bases are in particular nonnucleophilic or only weakly nucleophilic compounds. Examples of such bases are alkali metal hydroxides such as potassium hydroxide and sodium hydroxide, alkali metal carbonates such as potassium carbonate and sodium carbonate, and also alkali metal alkoxides of tertiary alcohols, such as lithium tert-butoxide, sodium tert-butoxide and potassium tert-butoxide, which are used in anhydrous form.

In general, from 0.8 to 1.5, preferably from 1 to 1.2, molar equivalents of base are used per mole of bromine atom to be substituted.

The molar ratio of brominated rylene dye I to alcohol or thioalcohol IV likewise depends on the number of bromine atoms to be substituted. In general, from 1 to 2 mol, preferably from 1 to 1.3 mol, of IV are used per mole of bromine atom to be exchanged.

The reaction temperature is typically in the range from 50 to 200° C., preferably from 60 to 140° C.

It is recommended to carry out the reaction under protective gas.

Depending on the reactivity of the brominated rylene dye I, the reaction time is from about 2 to 48 h.

Selection of the reaction conditions—amount of alcohol or thioalcohol IV and base and also reaction temperature—can advantageously be used to control the bromine exchange, so that not only rylene dyes I in which all bromine atoms have been exchanged but also rylene dyes I which still contain bromine can be prepared without any problems. If desired, the bromine can subsequently be removed from the rylene dye I.

In terms of method, the procedure in step d1) is advantageously that the solvent is initially charged, brominated rylene dye I, alcohol or thioalcohol IV and base are added, and the solution or suspension obtained is heated with stirring under protective gas to the desired reaction temperature for from 2 to 48 h.

The reaction product can be isolated after cooling to room temperature by directly filtering off the precipitated reaction product or by filtering off after diluting with 3-4 times the volume of water, of a dilute inorganic acid, for example from 5 to 10% by weight hydrochloric acid, or of an aliphatic alcohol, for example methanol, washing initially with a little solvent and subsequently with water until the washings are neutral and drying under reduced pressure.

In many cases, it may be advantageous for the achievement of a high product purity to carry out the reaction in two stages. In this case, the brominated rylene dye I is reacted initially with only a partial amount, advantageously the amount required to exchange the most labile bromine substituents, of alcohol or thioalcohol IV and base, the partly converted product is removed from the reaction mixture by filtration and subsequently reacted with the remaining amount of IV and base to give the desired product.

Rylene dyes I which are substituted by cyano in the rylene core can be prepared by step d2) of the processes according to the invention by reacting the brominated rylene dyes I with copper(I) cyanide in the presence of a dipolar aprotic organic solvent.

Suitable dipolar aprotic solvents are in particular sulfoxides such as dimethyl sulfoxide, sulfones, such as sulfolane, N-methylpyrrolidone, carboxamides such as dimethylformamide and dimethylacetamide, and nitrogen heterocycles such as pyridine, pyrimidine, quinoline, isoquinoline and quinaldine.

The amount of solvent is in itself uncritical, and typically from 20 to 100 g, preferably from 40 to 60 g, of solvent are used per gram of brominated rylene dye I.

The molar ratio of brominated rylene dye I to copper(I) cyanide depends on the number of bromine atoms to be substituted. In general, from 1 to 3 mol, preferably from 1 to 1.3 mol, of copper(I) cyanide are used per mole of bromine atom to be exchanged.

The reaction temperature is typically from 50 to 280° C., in particular from 100 to 180° C.

Advantageously, the reaction is carried out under protective gas.

The reaction time is generally from about 1 to 48 h.

In terms of method, the procedure in step d2) is advantageously that the solvent is initially charged, brominated rylene dye I and copper(I) cyanide are added and the solution or suspension obtained is heated with stirring under protective gas to the desired reaction temperature for from 1 to 48 h.

The reaction product can be isolated as in step d1).

Rylene dyes I which are substituted in the rylene core by optionally substituted $C_3$-$C_{18}$-1-alkynyl are obtainable in step d3) of the processes according to the invention by reacting the brominated rylene dyes I with an alkyne V in the presence of an aprotic solvent, of a palladium complex as a catalyst, of a copper salt as a cocatalyst and of a base.

Suitable aprotic solvents are in particular linear and cyclic aliphatic ethers having up to 10 carbon atoms, such as diethyl ether, di-n-propyl ether, di-n-butyl ether, 1,2-dimethoxyethane, 1,2-diethoxyethane, dioxane and in particular tetrahydrofuran.

In general, from 20 to 100 g, preferably from 40 to 60 g, of solvent are used per gram of brominated rylene dye I.

The base added serves simultaneously as a cosolvent. Suitable for this purpose are in particular organic nitrogen bases miscible with the ethers and having a melting point below room temperature and a boiling point above the reaction temperature. Preferred bases are aliphatic amines having up to 15 carbon atoms, in particular tertiary amines, such as triethylamine, tri-n-propylamine and tri-n-butylamine, and cycloaliphatic amines, in particular piperidine.

Typically, from 0.2 to 1.5 g, preferably from 0.8 to 1.2 g of base are used per gram of solvent.

Examples of palladium complexes suitable as catalyst are tetrakis(tris-o-tolylphosphine)palladium(0), [1,2-bis(diphenyl-phosphino)ethane]palladium(II) chloride, [1,1'-bis(diphylphosphino)ferrocene]palladium(II) chloride, bis(triethylphosphine)palladium(II) chloride, bis(tricyclohexylphosphine)-palladium(II) chloride, bis(triphenylphosphine)palladium(II) acetate, (2,2'-bipyridyl)

palladium(II) chloride and in particular tetrakis(triphenylphosphine)palladium(0), bis(triphenylphosphine)palladium(II) chloride, bis(acetonitrile)palladium(II) chloride and bis(benzonitrile)palladium(II) chloride.

An example of a copper(I) salt particularly suitable as a cocatalyst is copper(I) iodide.

In general, from 2 to 15 mol %, preferably from 5 to 10 mol %, of palladium complex, and generally from 2 to 20 mol %, preferably from 7 to 12 mol %, of copper salt, based in each case on brominated rylene dye I, is used.

The molar ratio of brominated rylene dye I to alkyne depends in turn on the number of bromine atoms to be substituted. In general, from 1 to 2 mol, preferably from 1 to 1.5 mol, of alkyne V are used per mole of bromine atom to be exchanged.

The reaction tempereature is typically from 20 to 140° C., in particular from 40 to 90° C.

Depending on the alkyne used, the reaction can be carried out at atmospheric pressure or at an increased pressure of typically up to 50 bar. The method under pressure is required when volatile alkynes are used.

The reaction time is typically from 3 to 12 h.

In terms of method, the procedure in step d3) is advantageously that the substantially anhydrous solvent and substantially anhydrous base are initially charged, brominated rylene dye I is added, then after repeated degassing and aeration with dry nitrogen, copper salt, palladium complex and alkyne (volatile alkynes are injected into the closed apparatus after weighing) are added with stirring under nitrogen to the solution or suspension obtained and heated to the desired reaction temperature for from 3 to 12 h.

The reaction product can be isolated as in step d1).

Rylene dyes I which are substituted in the rylene core by —NR$_3{}^2$ can be prepared in step d4) of the processes according to the invention by reacting the brominated rylene dyes I with ammonia or an amine VI in the presence of a dipolar aprotic organic solvent.

Suitable dipolar aprotic solvents are the solvents already mentioned by way of example for step d2).

The amount of solvent is in itself uncritical, and typically from 20 to 100 g, preferably from 40 to 60 g, of solvent are used per gram of brominated rylene dye I.

The molar ratio of brominated rylene dye I to ammonia or amine VI depends in turn on the number of bromine atoms to be substituted. In general, from 1 to 4 mol, preferably from 1 to 1.5 mol, of ammonia or amine VI are used per mole of bromine atom to be exchanged.

The reaction temperature is typically from 50 to 280° C., in particular from 80 to 160° C.

Depending on the amine VI used, the reaction can be carried out at atmospheric pressure or at an increased pressure of generally up to 50 bar. The method under pressure is required when ammonia or volatile amines VI are used.

In general, the substituted rylene dyes I obtained according to the invention already have such a high purity (>95%) that further purification can be dispensed with. Analytically pure products can be obtained by recrystallization from aromatic solvents such as toluene and xylene, or halogenated aliphatic or aromatic hydrocarbons such as methylene chloride and chloroform or chlorobenzene and 1,2-dichlorobenzene, or by filtration of a solution of the products in these solvents through silica gel and subsequent concentration.

The rylene dyes I according to the invention have outstanding suitability for homogeneous coloring of high molecular weight organic and inorganic materials, especially, for example, of plastics, in particular thermoplastics, paints and printing inks, and also oxidic layer systems.

They are also suitable as dispersants, pigment additives for organic pigments and intermediates for the preparation of pigment additives, for producing aqueous polymer dispersions which are colored or absorb in the near infrared region of the electromagnetic spectrum and as photoconductors in electrophotography.

EXAMPLES

Preparation of rylene dyes of the formulae I', I" and I'" according to the invention a1) Preparation of rylenanthramines III'

Examples 1 to 5

A mixture of $x_1$ g (9.0 mmol) of peri-bromorylene-3,4-dicarboximide II', 1.8 g (8.0 mmol) of 1-aminoanthraquinone, 60 mg (0.27 mmol) of palladium(II) acetate, 0.39 g (0.71 mmol) of bis(2-diphenylphosphinophenyl) ether and $a_1$ l of anhydrous toluene was admixed under nitrogen with 0.96 g (10.0 mmol) of sodium tert-butoxide and then heated to 80° C. After $t_2$ h, the reaction mixture was cooled to room temperature.

The reaction product was filtered off, washed initially with 250 ml of toluene, then with 500 ml of ethanol and finally with hot water and dried under reduced pressure at 80° C.

Further details on the experiments and also their results are compiled in table 1.

TABLE 1

| Ex. | $x_1$ [g] | peri-Bromorylene-3,4-dicarboximide II' | $a_1$ [l] | $t_1$ [h] | Yield [g]/[%] | Appearance | m.p. [° C.] |
|---|---|---|---|---|---|---|---|
| 1 | 5.0 | 9-Bromo-N-(2,6-diisopropylphenyl)-perylene-3,4-dicarboximide | 0.7 | 14 | 5.7/90 | gold-black, amorphous | >350 |
| 2 | 6.2 | 11-Bromo-N-dodecylterrylene-3,4-dicarboximide | 1.0 | 24 | 6.4/85 | black-violet, amorphous | >350 |
| 3 | 5.7 | 11-Bromo-N-(4-methoxyphenyl)-terrylene-3,4-dicarboximide | 1.0 | 24 | 6.3/90 | black-violet, amorphous | >350 |
| 4 | 6.2 | 11-Bromo-N-(2,6-diisopropylphenyl)-terrylene-3,4-dicarboximide | 1.0 | 24 | 6.8/91 | black-violet, microcrystalline | >350 |
| 5 | 7.3 | 13-Bromo-N-(2,6-diisopropylphenyl)-quaterrylene-3,4-dicarboximide | 1.5 | 40 | 6.8/80 | green-black, crystalline | >350 |

Analytical data for example 1:

N-(2,6-Diisopropylphenyl)-9-[N'-1-(aminoanthraquinonyl)]-perylene-3,4-dicarboximide:

Elemental analysis (% by wt. calc./found): C: 82.0/81.9; H: 4.9/4.9; N: 4.0/3.9; O: 9.1/9.0; Mass (FD, 8 kV): m/z=702.2

(M$^+$, 100%); IR (KBr): ν (cm$^{-1}$)=1697, 1662, 1629, 1592, 1563; UV/VIS (CHCl$_3$): λ$_{max}$ (ε)=530 (28 400) nm.

Analytical data for example 2:

N-Dodecyl-9-[N'-1-(aminoanthraquinonyl)]perylene-3,4-dicarboximide:

Elemental analysis (% by wt. calc./found): C: 81.1/81.0; H: 6.0/5.9; N: 3.9/4.0; O: 9.0/9.1; Mass (FD, 8 kV): m/z=710.3 (M$^+$, 100%).

Analytical data for example 3:

N-(4-Methoxyphenyl)-9-[N'-1-(aminoanthraquinonyl)]-perylene-3,4-dicarboximide:

Elemental analysis (% by wt. calc./found): C: 79.6/79.6; H: 3.7/3.6; N: 4.3/4.4; O: 12.3/12.3; Mass (FD, 8 kV): m/z=648.2 (M$^+$, 100%).

Analytical data for example 4:

N-(2,6-Diisopropylphenyl)-11-[N'-1-(aminoanthraquinonyl)]-terrylene-3,4-dicarboximide:

Elemental analysis (% by wt. calc./found): C: 84.2/84.0; H: 4.6/4.8; N: 3.4/3.6; O: 7.7/7.5; Mass (FD, 8 kV): m/z=826.3 (M$^+$, 100%).

Analytical data for example 5:

N-(2,6-Diisopropylphenyl)-13-[N'-1-(aminoanthraquinonyl)]-quaterrylene-3,4-dicarboximide:

Elemental analysis (% by wt. calc./found): C: 85.9/86.0; H: 4.5/4.3; N: 3.0/3.2; O: 6.7/6.4; Mass (FD, 8 kV): m/z=950.3 (M$^+$, 100%).

a2) Preparation of rylenanthramines III"

Examples 6 to 11

A mixture of x$_2$ g (9.0 mmol) of peri-bromorylene-3,4-dicarboximide II', 0.95 g (4.0 mmol) of 1,5-diaminoanthraquinone, 60 mg (0.27 mmol) of palladium(II) acetate, 0.39 g (0.71 mmol) of bis(2-diphenylphosphinophenyl)ether and a$_2$ l of anhydrous toluene was admixed under nitrogen with 0.96 g (10.0 mmol) of sodium tert-butoxide and then heated to 80° C. After t$_2$ h, the reaction mixture was cooled to room temperature.

The reaction product was filtered off, washed initially with 250 ml of toluene, then with 500 ml of ethanol and finally with hot water and dried under reduced pressure at 80° C.

Further details on the experiments and also their results are compiled in table 2. The yield is based on II".

m/z=948.4 (M$^+$, 100%); IR (KBr): ν (cm$^{-1}$)=1706, 1668, 1629, 1571; UV/VIS (CHCl$_3$): λ$_{max}$ (ε)=426 (18 400), 531 (13 200) nm.

Analytical data for example 7:

N,N'-Bis[9-(N"-(2,6-diisopropylphenyl)perylene-3,4-dicarboximid)yl]-1,5-diaminoanthraquinone:

Elemental analysis (% by wt. calc./found): C: 82.3/82.0; H: 5.1/5.3; N: 4.7/4.7; O: 8.0/8.0; Mass (FD, 8 kV): m/z=1196.5 (M$^+$, 100%); IR (KBr): ν (cm$^{-1}$)=1702, 1662, 1627, 1594, 1565; UV/VIS (CHCl$_3$): λ$_{max}$ (ε)=556 (27 100) nm.

Analytical data for example 8:

N,N'-Bis[9-(N"-dodecylperylene-3,4-dicarboximid)yl]-1,5-diaminoanthraquinone:

Elemental analysis (% by wt. calc./found): C: 81.2/81.0; H: 6.3/6.3; N: 4.6/4.7; O: 7.9/7.9; Mass (FD, 8 kV): m/z=1212.6 (M$^+$, 100%).

Analytical data for example 9:

N,N'-Bis[9-(N"-(4-methoxyphenyl)perylene-3,4-dicarboximid)yl]-1,5-diaminoanthraquinone:

Elemental analysis (% by wt. calc./found): C: 79.4/79.5; H: 3.7/3.5; N: 5.1/5.0; O: 11.8/11.9; Mass (FD, 8 kV): m/z=1088.3 (M$^+$, 100%).

Analytical data for example 10:

N,N'-Bis[11-(N"-(2,6-diisopropylphenyl)terrylene-3,4-dicarboximid)yl]-1,5-diaminoanthraquinone:

Elemental analysis (% by wt. calc./found): C: 84.7/84.5; H: 4.7/4.8; N: 3.9/3.9; O: 6.6/6.7; Mass (FD, 8 kV): m/z=1444.5 (M$^+$, 100%); IR (KBr): ν (cm$^{-1}$)=1700, 1669, 1635, 1565.

Analytical data for example 11:

N,N'-Bis[13-(N"-(2,6-diisopropylphenyl)quaterrylene-3,4-dicarboximid)yl]-1,5-diaminoanthraquinone:

Elemental analysis (% by wt. calc./found): C: 86.5/86.5; H: 4.5/4.3; N: 3.3/3.4; O: 5.7/5.7; Mass (FD, 8 kV): m/z=1692.6 (M$^+$, 100%); IR (KBr): ν (cm$^{-1}$)=1708, 1666, 1627, 1566.

a3) Preparation of rylenanthramines III'''

Example 12

Step a'):

A mixture of 3.3 g (7.5 mmol) of N-(2,6-diisopropylphenyl)-4-bromonaphthalene-1,8-dicarboximide (II'), 2.4 g (10.0 mmol) of 1,5-diaminoanthraquinone, 60 mg (0.27 mmol) of palladium(II) acetate, 0.39 g (0.71 mmol) of bis(2-

TABLE 2

| Ex. | x$_2$ [g] | peri-Bromorylene-3,4-dicarboximide II' | a$_2$ [l] | t$_2$ [h] | Yield [g]/[%] | Appearance | m.p. [° C.] |
|---|---|---|---|---|---|---|---|
| 6 | 4.0 | 4-Bromo-N-(2,6-diisopropylphenyl)-naphthalene-1,8-dicarboximide | 0.4 | 24 | 4.0/94 | dark brown, amorphous | 245 |
| 7 | 5.0 | 9-Bromo-N-(2,6-diisopropylphenyl)-perylene-3,4-dicarboximide | 0.5 | 18 | 5.0/92 | black-violet, microcrystalline | 290 |
| 8 | 6.2 | 11-Bromo-N-dodecylterrylene-3,4-dicarboximide | 1.0 | 24 | 5.5/84 | black, amorphous | >350 |
| 9 | 5.7 | 11-Bromo-N-(4-methoxyphenyl)-terrylene-3,4-dicarboximide | 1.0 | 24 | 5.2/86 | black-violet, amorphous | >350 |
| 10 | 6.2 | 11-Bromo-N-(2,6-diisopropylphenyl)-terrylene-3,4-dicarboximide | 1.0 | 30 | 6.1/93 | black-violet, amorphous | >350 |
| 11 | 7.3 | 13-Bromo-N-(2,6-diisopropylphenyl)-quaterrylene-3,4-dicarboximide | 2.0 | 40 | 6.7/88 | black, microcrystalline | >350 |

Analytical data for example 6:

N,N'-Bis[4-(N"-(2,6-diisopropylphenyl)naphthalene-1,8-dicarboximid)yl]-1,5-diaminoanthraquinone:

Elemental analysis (% by wt. calc./found): C: 78.5/78.7; H: 5.5/5.3; N: 5.9/5.8; O: 10.1/10.0; Mass (FD, 8 kV):

diphenylphosphinophenyl) ether and 500 ml of anhydrous toluene was admixed under nitrogen with 0.77 g (8.0 mmol) of sodium tert-butoxide and then heated to 80° C. After 20 h, the reaction mixture was cooled to room temperature.

The crude product was filtered off, washed initially with 100 ml of toluene, then with 300 ml of ethanol and finally with hot water, and dried under reduced pressure at 80° C. Column chromatography on silica gel using chloroform as the eluent provided pure N-[4-(N'-(2,6-diisopropylphenyl)-naphthalene-1,8-dicarboximid)yl]-1,5-diaminoanthraquinone.

Step a"):

A mixture of 5.0 g (9.0 mmol) of 9-bromo-N-(2,6-diisopropyl-phenyl)perylene-3,4-dicarboximide (II'''), 4.5 g (7.5 mmol) of N-[4-(N'-(2,6-diisopropylphenyl)naphthalene-1,8-dicarboximid)yl]-1,5-diaminoanthraquinone, 60 mg (0.27 mmol) of palladium(II) acetate, 0.39 g (0.71 mmol) of bis(2-diphenylphosphinophenyl) ether and 1 l of anhydrous toluene was admixed under nitrogen with 0.96 g (10.0 mmol) of sodium tert-butoxide and then heated to 80° C. After 24 h, the reaction mixture was cooled to room temperature.

The reaction product was filtered off, washed initially with 150 ml of toluene, then with 500 ml of ethanol and finally with hot water, and dried under reduced pressure at 80° C.

5.6 g of rylenanthramine III''' were obtained, which corresponds to a yield of 52%, based on 1,5-diaminoanthraquinone.

Analytical data for example 12:

N-[4-(N''-(2,6-Diisopropylphenyl)naphthalene-1,8-dicarboximid)yl]-N'-[9-(N'''-(2,6-diisopropylphenyl)perylene-3,4-dicarboximid)yl]-1,5-diaminoanthraquinone:

Elemental analysis (% by wt. calc./found): C: 80.6/80.4; H: 5.3/5.4; N: 5.2/5.4; O: 8.9/8.7; Mass (FD, 8 kV): m/z=1073.3 (M$^+$, 100%); IR (KBr): $\nu$ (cm$^{-1}$)=1704, 1669, 1631, 1568; UV/VIS (CHCl$_3$): $\lambda_{max}$=433, 561 nm.

b) Preparation of unsubstituted rylene dyes I', I'' and I'''

Examples 13 to 24

A mixture of 15.0 g (133 mmol) of potassium tert-butoxide, 20.0 g (131 mmol) of 1,8-diazabicyclo[5.4.0]undec-7-ene and 200 ml of diethylene glycol diethyl ether was stirred under nitrogen at 120° C. for 1 h. After adding X$_3$ g (10.0 mmol) of rylenanthramine III', III'' or III''' suspended in 100 ml of anhydrous N-methylpyrrolidone, the mixture was heated to T$_3$° C. and kept at this temperature for t$_3$ h.

After cooling to 50° C. and adding 300 ml of methanol, the reaction mixture was cooled to room temperature. Sufficient 50% by weight acetic acid was then added to set a pH of 6. The crude product was filtered off, washed with hot water until the washings were neutral, dried at 100° C. under reduced pressure and subsequently purified by Soxhlett extraction using tetrahydrofuran.

Further details on these experiments and also their results are compiled in table 3.

Analytical data for example 13:

Cyclodehydrogenation product of N-(2,6-diisopropylphenyl)-9-[N'-1-(aminoanthraquinonyl)]perylene-3,4-dicarboximide:

Elemental analysis (% by wt. calc./found): C: 82.3/82.1; H: 4.6/4.8; N: 4.0/4.0; O: 9.1/9.0; Mass (FD, 8 kV): m/z=700.2 (M$^+$, 100%); UV/VIS (1,2,4-trichlorobenzene): $\lambda_{max}$($\epsilon$)=601 (23 200), 800 (22 000) nm.

Analytical data for example 14:

Cyclodehydrogenation product of N-dodecyl-9-[N'-1-(aminoanthraquinonyl)]perylene-3,4-dicarboximide:

Elemental analysis (% by wt. calc./found): C: 81.3/81.3; H: 5.7/5.8; N: 4.0/3.9; O: 9.0/8.9; Mass (FD, 8 kV): m/z=708.3 (M$^+$, 100%); UV/VIS (1,2,4-trichlorobenzene): $\lambda_{max}$($\epsilon$)=602 (23 100), 802 (22 000) nm.

Analytical data for example 15:

Cyclodehydrogenation product of N-(4-methoxyphenyl)-9-[N'-1-(aminoanthraquinonyl)]perylene-3,4-dicarboximide:

Elemental analysis (% by wt. calc./found): C: 79.9/79.8; H: 3.4/3.4; N: 4.3/4.4; O: 12.4/12.3; Mass (FD, 8 kV): m/z=646.2 (M$^+$, 100%); UV/VIS (1,2,4-trichlorobenzene): $\lambda_{max}$($\epsilon$)=602 (23 100), 801 (21 900) nm.

Analytical data for example 16:

Cyclodehydrogenation product of N-(2,6-diisopropylphenyl)-11-[N'-1-(aminoanthraquinonyl)]terrylene-3,4-dicarboximide:

Elemental analysis (% by wt. calc./found): C: 84.5/84.7; H: 4.4/4.4; N: 3.4/3.2; O: 7.8/7.6; Mass (FD, 8 kV): m/z=824.9 (M$^+$, 100%).

Analytical data for example 17:

Cyclodehydrogenation product of N-(2,6-diisopropylphenyl)-13-[N'-1-(aminoanthraquinonyl)]quaterrylene-3,4-dicarboximide:

Elemental analysis (% by wt. calc./found): C: 86.1/86.0; H: 4.3/4.4; N: 3.0/3.2; O: 6.7/6.4; Mass (FD, 8 kV): m/z=948.3 (M$^+$, 100%).

Analytical data for example 18:

Cyclodehydrogenation product of N,N'-bis[4-(N''-(2,6-diisopropylphenyl)naphthalene-1,8-dicarboximid)yl]-1,5-diaminoanthraquinone:

Elemental analysis (% by wt. calc./found): C: 78.8/78.5; H: 5.1/5.3; N: 5.9/5.9; O: 10.2/10.2; Mass (FD, 8 kV): m/z=944.4 (M$^+$, 100%); IR (KBr): $\nu$ (cm$^{-1}$)=1697, 1654, 1621; UV/VIS (1,2,4-trichlorobenzene): $\lambda_{max}$ ($\epsilon$)=440 (15 800), 735 (16 000), 778 (15 900) nm.

Analytical data for example 19:

TABLE 3

| Ex. | x$_3$ [g] | Rylenanthraquinone imide III from ex. | T$_3$ [° C.] | t$_3$ [h] | Yield [g]/[%] | Appearance | m.p. [° C.] |
|---|---|---|---|---|---|---|---|
| 13 | 7.0 | 1 | 130 | 2 | 6.4/92 | blue-green, amorphous | >350 |
| 14 | 8.4 | 2 | 140 | 12 | 6.8/82 | violet-black, amorphous | >350 |
| 15 | 7.7 | 3 | 140 | 6 | 6.0/78 | black, amorphous | >350 |
| 16 | 8.3 | 4 | 140 | 8 | 6.9/84 | blue-black, amorphous | >350 |
| 17 | 9.5 | 5 | 130 | 6 | 6.1/64 | black, amorphous | >350 |
| 18 | 9.5 | 6 | 125 | 12 | 6.8/72 | green, amorphous | >350 |
| 19 | 12.0 | 7 | 130 | 24 | 6.3/53 | violet-black, amorphous | >350 |
| 20 | 14.6 | 8 | 160 | 40 | 9.2/63 | black, amorphous | >350 |
| 21 | 13.3 | 9 | 160 | 12 | 7.6/57 | black, amorphous | >350 |
| 22 | 14.5 | 10 | 160 | 12 | 9.8/68 | black, amorphous | >350 |
| 23 | 16.9 | 11 | 160 | 48 | 8.8/52 | black, amorphous | >350 |
| 24 | 10.7 | 12 | 140 | 36 | 6.4/60 | blue-black, amorphous | >350 |

Cyclodehydrogenation product of N,N'-bis[9-(N"-(2,6-diisopropylphenyl)perylene-3,4-dicarboximid)yl]-1,5-diaminoanthraquinone:

Elemental analysis (% by wt. calc./found): C: 82.5/82.2; H: 4.7/4.8; N: 4.7/4.7; O: 8.0/7.8; Mass (FD, 8 kV): m/z=1192.4 (M$^+$, 100%).

Analytical data for example 20:

Cyclodehydrogenation product of N,N'-bis[9-(N"-dodecylperylene-3,4-dicarboximid)yl]-1,5-diaminoanthraquinone:

Elemental analysis (% by wt. calc./found): C: 81.4/81.4; H: 6.0/5.9; N: 4.6/4.5; O: 7.9/8.0; Mass (FD, 8 kV): m/z=1208.6 (M$^+$, 100%).

Analytical data for example 21:

Cyclodehydrogenation product of N,N'-bis[9-(N"-(4-methoxyphenyl)perylene-3,4-dicarboximid)yl]-1,5-diaminoanthraquinone:

Elemental analysis (% by wt. calc./found): C: 79.7/79.6; H: 3.3/3.4; N: 5.2/5.0; O: 11.8/11.9; Mass (FD, 8 kV): m/z=1084.3 (M$^+$, 100%).

Analytical data for example 22:

Cyclodehydrogenation product of N,N'-bis[11-(N"-(2,6-diisopropylphenyl)terrylene-3,4-dicarboximid)yl]-1,5-diaminoanthraquinone:

Elemental analysis (% by wt. calc./found): C: 85.0/85.1; H: 4.5/4.3; N: 3.9/3.9; O: 6.7/6.7; Mass (FD, 8 kV): m/z=1445.7 (M$^+$, 100%).

Analytical data for example 23:

Cyclodehydrogenation product of N,N'-bis[13-(N"-(2,6-diisopropylphenyl)quaterrylene-3,4-dicarboximid)yl]-1,5-diaminoanthraquinone:

Elemental analysis (% by wt. calc./found): C: 86.7/86.6; H: 4.3/4.3; N: 3.3/3.3; O: 5.7/5.7; Mass (FD, 8 kV): m/z=1688.6 (M$^+$, 100%).

Analytical data for example 24:

Cyclodehydrogenation product of N-[4-(N"-(2,6-diisopropylphenyl)naphthalene-1,8-dicarboximid)yl]-N'-[9-(N'''-(2,6-diisopropylphenyl)perylene-3,4-dicarboximid)yl]-1,5-diaminoanthraquinone:

Elemental analysis (% by wt. calc./found): C: 80.9/80.8; H: 4.9/5.0; N: 5.2/5.3; O: 9.0/8.8; Mass (FD, 8 kV): m/z=1068.4 (M$^+$, 100%).

c) Preparation of brominated rylene dyes I' and I"

Examples 25 and 26

$x_4$ g (10 mmol) of the unsubstituted rylene dye I' or I" were suspended in 0.5 l of chlorobenzene for 30 min. After adding 0.1 g (0.44 mmol) of iodine and $y_4$ g ($b_4$ mol) of bromine, the mixture was stirred with the exclusion of light at 50° C. for 16 h.

After the reaction had been ended, excess bromine was removed from the reaction mixture by passing through a vigorous nitrogen stream. After diluting the mixture with 1 l of methanol, the mixture was stirred at room temperature overnight. The precipitated product was filtered off, washed initially with 0.5 l of methanol and then with water until the washings were neutral and dried at 120° C. under reduced pressue. The crude product was purified by a column filtration on silica gel using chloroform as the eluent.

Further details on these experiments and also their results are compiled in table 4. The degree of bromination is quoted as the number m of bromine atoms per molecule of rylene dye.

TABLE 4

| Ex. | $x_4$ [g] | Rylene dye I from ex. | $y_4$ [g] | $b_4$ [mol] | m | Yield [g]/[%] | Appearance | m.p. [° C.] |
|---|---|---|---|---|---|---|---|---|
| 25 | 7.0 | 13 | 10.0 | 0.10 | 2 | 7.6/89 | blue-green, amorphous | >350 |
| 26 | 11.9 | 19 | 16.0 | 0.10 | 4 | 9.7/64 | violet-black, amorphous | >350 |

Analytical data for example 25:

Elemental analysis (% by wt. calc./found): C: 67.2/67.1; H: 3.5/3.6; N: 3.3/3.1; O: 7.5/7.3; Br, 18.6/18.9; Mass (FD, 8 kV): m/z=856.1 (M$^+$, 100%).

Analytical data for example 26:

Elemental analysis (% by wt. calc./found): C: 65.3/65.1; H: 3.5/3.5; N: 3.7/3.5; O: 6.4/6.5; Br, 21.2/21.5; Masse (FD, 8 kV): m/z=1504.1 (M$^+$, 100%).

d1) Preparation of a di-cyano-substituted rylene dye I'

Example 27

8.58 g (10 mmol) of the dibrominated rylene dye I' from example 25 and 3.00 g (36 mmol) of copper(I) cyanide were suspended under nitrogen in 0.2 l of sulfolane for 30 min. The mixture was then heated to 285° C. for 2 h.

After the reaction had been ended and 0.5 l of methanol had been added, the precipitate was removed. The residue was heated with 15 g of iron(III) chloride hexahydrate, 150 ml of water and 36 ml of conc. hydrochloric acid to 70° C. for 1 h. After cooling, the precipitate was removed, washed with water and dried at 120° C. under reduced pressure.

7.23 g of the rylene dye I' were obtained as a violet powder. The crude product was purified by column filtration through silica gel using chloroform as the eluent to remove insoluble constituents.

Analytical data for example 27:

Elemental analysis (% by wt. calc./found): C: 78.0/77.9; H: 4.0/4.1; N: 7.5/7.4; O: 8.5/8.5; Mass (FD, 8 kV): m/z=750.2 (M$^+$, 100%).

d2) Preparation of a di-hexynyl-substituted rylene dye I'

Example 28

4.29 g (5 mmol) of the dibrominated rylene dye I' from example 25 were introduced in a nitrogen countercurrent with stirring into a mixture of 200 ml of freshly distilled piperidine and 200 ml of tetrahydrofuran. After successive addition of 90 mg (0.46 mmol) of copper(I) iodide, 450 mg (0.38 mmol) of tetrakis(triphenylphosphine)palladium(0) and 1.016 g (12 mmol) of 1-hexyne, the mixture was heated under nitrogen to 80° C. for 10 h.

After cooling to room temperature, the resultant black reaction mixture was introduced with stirring into 1.2 l of semiconcentrated hydrochloric acid. The precipitated reaction product was washed initially with 0.5 l of semiconcentrated hydrochloric acid, then washed to neutrality with water and dried at 100° C. under reduced pressure. The crude product was purified chromatographically on silica gel using chloroform as the eluent.

2.19 g of the rylene dye I' in the form of a black-violet powder were obtained, which corresponds to a yield of 51%.

Analytical data for example 28:

Elemental analysis (% by wt. calc./found): C: 83.7/83.4; H: 5.62/5.75; N: 3.25/3.33; O: 7.43/7.52; Mass (FD, 8 kV): m/z=860.4 (M$^+$, 100%).

d3) Preparation of phenoxy-substituted rylene dyes I', I" and I'"

Examples 29 and 30

A mixture of $x_5$ g (10 mmol) of the brominated rylene dye I, $y_5$ g ($b_5$ mmol) of tert-octylphenol, $z_5$ g ($c_5$ mmol) of potassium carbonate and 300 ml of N-methylpyrrolidone were heated with stirring under nitrogen to 85° C. for $t_5$ h.

After cooling to room temperature and adding 500 ml of methanol, the reaction product was filtered off, washed with water until the washings were neutral and subsequently dried at 80° C. under reduced pressure. To remove insoluble constituents, a column filtration was carried out on silica gel using dichloromethane as the eluent.

Further details on these experiments and also their results are compiled in table 5. m is the number of phenoxy susbstituents per molecule of rylene dye.

TABLE 5

| Ex. | $x_5$ [g] | Brominated rylene dye I from ex. | $y_5$ [g] $b_5$ [mmol] | $z_5$ [g] $c_5$ [mmol] | $t_5$ [h] | m | Yield [g]/[%] | Appearance | m.p. [° C.] |
|---|---|---|---|---|---|---|---|---|---|
| 29 | 8.6 | 25 | 4.522 | 3.324 | 8 | 2 | 9.1/82 | violet-black, amorphous | >350 |
| 30 | 15.1 | 26 | 9.144 | 6.648 | 16 | 4 | 14.1/70 | black, amorphous | >350 |

Analytical data for example 30:
Elemental analysis (% by wt. calc./found): C: 67.2/67.1; H: 3.5/3.6; N: 3.3/3.1; O: 7.5/7.3; Br, 18.6/18.9; Mass (FD, 8 kV): m/z=856.1 (M$^+$, 100%).

Analytical data for example 31:
Elemental analysis (% by wt. calc./found): C: 65.3/65.1; H: 3.5/3.5; N: 3.7/3.5; O: 6.4/6.5; Br, 21.2/21.5; Mass (FD, 8 kV): m/z=1504.1 (M$^+$, 100%).

We claim:

1. A rylene dye of the general formula I

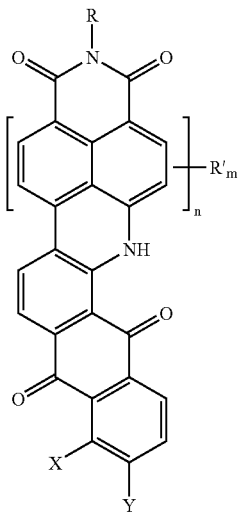

I where the variables are defined as follows:
$R_{13}$ is hydrogen;
$C_1$-$C_{30}$-alkyl whose carbon chain may be interrupted by one or more —O—, —S—, —NR$^1$—, —CO— and/or —SO$_2$— moieties and may be mono- or polysubstituted by carboxyl, sulfo, hydroxyl, cyano, $C_1$-$C_6$-alkoxy and/or a 5- to 7-membered heterocyclic radical which is bonded via a nitrogen atom and may contain further heteroatoms and be aromatic;

$C_5$-$C_8$-cycloalkyl whose carbon framework may be interrupted by one or more —O—, —S— and/or —NR$^1$— moieties and may be mono- or polysubstituted by $C_1$-$C_6$-alkyl;

aryl or hetaryl which may each be mono- or polysubstituted by $C_1$-$C_{18}$-alkyl, $C_1$-$C_6$-alkoxy, halogen, hydroxyl, cyano, carboxyl, —CONHR$^2$, —NHCOR$^2$ and/or aryl- or hetarylazo, each of which may be substituted by $C_1$-$C_{10}$-alkyl, $C_1$-$C_6$-alkoxy, halogen, hydroxyl, cyano and/or carboxyl;

R' is bromine; cyano; —NR$^3{}_2$;
aryloxy, arylthio, hetaryloxy or hetarylthio, each of which may be mono- or polysubstituted by $C_1$-$C_{12}$-alkyl, $C_1$-$C_{12}$-alkoxy, cyano, —CONHR$^2$ and/or —NHCOR$^2$;
$C_3$-$C_{18}$-alk-1-ynyl whose carbon chain may be interrupted by one or more —O—, —S—, —NR$^1$—, —CO— and/or —SO$_2$— moieties and may be mono- or polysubstituted by —COOR$^1$, —SO$_3$R$^1$, hydroxyl, cyano, $C_1$-$C_6$-alkoxy, $C_5$-$C_8$-cycloalkyl, aryl and/or a 5- to 7-membered heterocyclic radical which is bonded via a nitrogen atom and may contain further heteroatoms and be aromatic;

R$^1$ is hydrogen or $C_1$-$C_6$-alkyl;
R$^2$ is hydrogen; $C_1$-$C_{18}$-alkyl; aryl or hetaryl, each of which may be substituted by $C_1$-$C_8$-alkyl, $C_1$-$C_6$-alkoxy, halogen, hydroxyl and/or cyano;
R$^3$ is hydrogen; $C_1$-$C_{18}$-alkyl; aryl or hetaryl, each of which may be substituted by $C_1$-$C_8$-alkyl, $C_1$-$C_6$-alkoxy, halogen, hydroxyl and/or cyano; both R$^3$ radicals may be joined to give a 5- to 7-membered heterocyclic radical which contains the nitrogen atom and is bonded via it;
X, Y are both hydrogen or bonded together to form a six-membered ring in a radical of the formula Ia

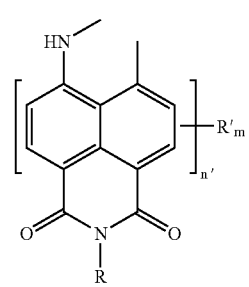

Ia where X is the —NH— group and Y is the other free chemical bond;

n is 2, 3, 4 or additionally 1 when X and Y are a radical of the formula Ia;

n' is from 1 to 4;

m is from 0 to 6.

2. A rylene dye of the formula I as claimed in claim 1, where the variables are defined as follows:

R is $C_1$-$C_{30}$-alkyl whose carbon chain may be interrupted by one or more —O—, —S—, —NR$^1$—, —CO— and/or —SO$_2$— moieties and may be mono- or polysubstituted by hydroxyl, cyano, $C_1$-$C_6$-alkoxy and/or a 5- to 7-membered heterocyclic radical which is bonded via a nitrogen atom and may contain further heteroatoms and be aromatic;

aryl or hetaryl which may each be mono- or polysubstituted by $C_1$-$C_{18}$-alkyl, $C_1$-$C_6$-alkoxy, hydroxyl, cyano, —CONHR$^2$ and/or —NHCOR$^2$;

R' is bromine or aryloxy which may be mono- or polysubstituted by $C_1$-$C_{12}$-alkyl, $C_1$-$C_6$-alkoxy and/or cyano;

R$^1$ is hydrogen or $C_1$-$C_6$-alkyl;

R$^2$ is hydrogen; $C_1$-$C_{18}$-alkyl; aryl or hetaryl, each of which may be substituted by $C_1$-$C_8$-alkyl, $C_1$-$C_6$-alkoxy and/or cyano;

X, Y are both hydrogen or bonded together to form a six-membered ring in a radical of the formula Ia

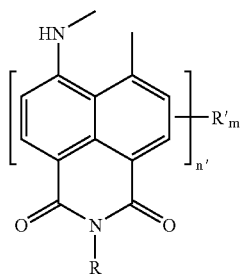

Ia where X is the —NH— group and Y is the other free chemical bond;

n is 2, 3, 4 or additionally 1 when X and Y are a radical of the formula Ia;

n' is from 1 to 4;

m is from 0 to 6.

3. A process for preparing rylene dyes of the general formula I'

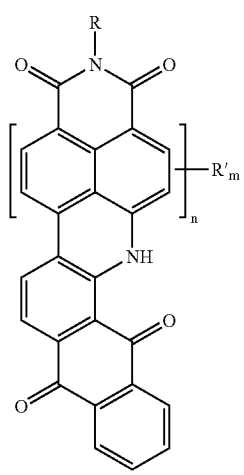

I' where the variables are defined as follows:

R is hydrogen;

$C_1$-$C_{30}$-alkyl whose carbon chain may be interrupted by one or more —O—, —S—, —NR$^1$—, —CO— and/or —SO$_2$— moieties and may be mono- or polysubstituted by carboxyl, sulfo, hydroxyl, cyano, $C_1$-$C_6$-alkoxy and/or a 5- to 7-membered heterocyclic radical which is bonded via a nitrogen atom and may contain further heteroatoms and be aromatic;

$C_5$-$C_8$-cycloalkyl whose carbon framework may be interrupted by one or more —O—, —S— and/or —NR$^1$— moieties and may be mono- or polysubstituted by $C_1$-$C_6$-alkyl;

aryl or hetaryl which may each be mono- or polysubstituted by $C_1$-$C_{18}$-alkyl, $C_1$-$C_6$-alkoxy, halogen, hydroxyl, cyano, carboxyl, —CONHR$^2$, —NHCOR$^2$ and/or aryl- or hetarylazo, each of which may be substituted by $C_1$-$C_{10}$-alkyl, $C_1$-$C_6$-alkoxy, halogen, hydroxyl, cyano or carboxyl;

R' is bromine; cyano; —NR$^3$$_2$;

aryloxy, arylthio, hetaryloxy or hetarylthio, each of which may be mono- or polysubstituted by $C_1$-$C_{12}$-alkyl, $C_1$-$C_{12}$-alkoxy, cyano, —CONHR$^2$ and/or —NHCOR$^2$;

$C_3$-$C_{18}$-alk-1-ynyl whose carbon chain may be interrupted by one or more —O—, —S—, —NR$^1$—, —CO— and/or —SO$_2$— moieties and may be mono- or polysubstituted by —COOR$^1$, —SO$_3$R$^1$, hydroxyl, cyano, $C_1$-$C_6$-alkoxy, $C_5$-$C_8$-cycloalkyl, aryl and/or a 5- to 7-membered heterocyclic radical which is bonded via a nitrogen atom and may contain further heteroatoms and be aromatic;

R$^1$ is hydrogen or $C_1$-$C_6$-alkyl;

R$^2$ is hydrogen; $C_1$-$C_{18}$-alkyl; aryl or hetaryl, each of which may be substituted by $C_1$-$C_8$-alkyl, $C_1$-$C_6$-alkoxy, halogen, hydroxyl or cyano;

R$^3$ is hydrogen; $C_1$-$C_{18}$-alkyl; aryl or hetaryl, each of which may be substituted by $C_1$-$C_8$-alkyl, $C_1$-$C_6$-alkoxy, halogen, hydroxyl and/or cyano; both R$^3$ radicals may be joined to give a 5- to 7-membered heterocyclic radical which contains the nitrogen atom and is bonded via it;

n is 2, 3 or 4;

m is from 0 to 6, which comprises a) reacting a rylene derivative monobrominated in the peri-position of the general formula II'

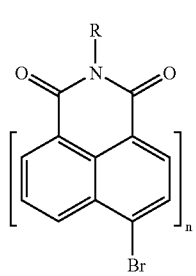

II' with 1-aminoanthraquinone in a cross-coupling reaction in the presence of an aprotic organic solvent, of a transition metal catalyst system and of a base, b) cyclizing the rylenanthramine formed in step a) of the general formula III'

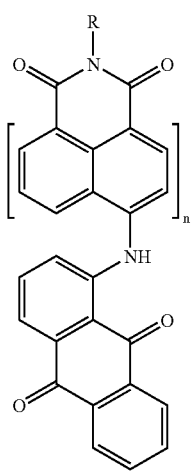

in the presence of a polar organic solvent and of a base to give the rylene dye of the formula I' which is unsubstituted in the rylene core and where m is 0, and c) if desired, converting the rylene dye I' unsubstituted in the rylene core and obtained in step b) to the rylene dye of the formula I' brominated in the rylene core where R' is bromine and m does not equal 0 by reacting with elemental bromine, and d) if desired, converting the rylene dye I' brominated in the rylene core and obtained in step c)

d1) by reacting with a compound of the general formula IV

where Z is sulfur or oxygen and the ring A is an aryl or hetaryl radical, each of which may be mono- or polysubstituted by $C_1$-$C_{12}$-alkyl, $C_1$-$C_{12}$-alkoxy, cyano, —CONHR$^2$ and/or —NHCOR$^2$, in the presence of an inert nitrogen-basic organic solvent and of a base to give the rylene dye of the formula I' which is substituted in the rylene core and where R' is aryloxy, arylthio, hetaryloxy or hetarylthio, each of which may be mono- or polysubstituted by $C_1$-$C_{12}$-alkyl, $C_1$-$C_{12}$-alkoxy, cyano, —CONHR$^2$ and/or —NHCOR$^2$, and m does not equal 0, d2) by reacting with copper(I) cyanide in the presence of a dipolar aprotic organic solvent to give the rylene dye of the formula I' which is substituted in the rylene core and where R' is cyano and m does not equal 0, d3) by reacting with an alkyne of the general formula V

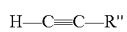

where R" is a $C_1$-$C_{16}$-alkyl radical which may be interrupted by one or more —O—, —S—, —NR$^1$—, —CO— and/or —SO$_2$— moieties and may be mono- or polysubstituted by —COOR$^1$, —SO$_3$R$^1$, hydroxyl, cyano, $C_1$-$C_6$-alkoxy, $C_5$-$C_8$-cycloalkyl, aryl and/or a 5- to 7-membered heterocyclic radical which is bonded via a nitrogen atom and may contain further heteroatoms and be aromatic, in the presence of an aprotic organic solvent, of a palladium complex as a catalyst, of a copper salt as a cocatalyst and of a base to give the rylene dye of the formula I' which is substituted in the rylene core and where R' is —C≡C—R" and m does not equal 0, or d4) by reacting with ammonia or an amine of the general formula VI

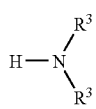

in the presence of a dipolar aprotic organic solvent to give the rylene dye of the formula I' which is substituted in the rylene core and where R' is —NR$^3{}_2$ and m does not equal 0.

4. A process for preparing symmetrical rylene dyes of the general formula I"

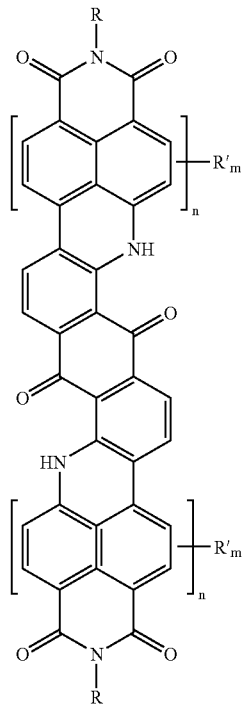

where the variables are defined as follows:

R is hydrogen;

$C_1$-$C_{30}$-alkyl whose carbon chain may be interrupted by one or more —O—, —S—, —NR$^1$—, —CO— and/or —SO$_2$— moieties and may be mono- or polysubstituted by carboxyl, sulfo, hydroxyl, cyano, $C_1$-$C_6$-alkoxy and/or a 5- to 7-membered heterocyclic radical which is bonded via a nitrogen atom and may contain further heteroatoms and be aromatic;

$C_5$-$C_8$-cycloalkyl whose carbon framework may be interrupted by one or more —O—, —S— and/or —NR$^1$— moieties and may be mono- or polysubstituted by $C_1$-$C_6$-alkyl;

aryl or hetaryl which may each be mono- or polysubstituted by $C_1$-$C_{18}$-alkyl, $C_1$-$C_6$-alkoxy, halogen, hydroxyl, cyano, carboxyl, —CONHR$^2$, —NHCOR$^2$ and/or aryl- or hetarylazo, each of which may be substituted by $C_1$-$C_{10}$-alkyl, $C_1$-$C_6$-alkoxy, halogen, hydroxyl, cyano and/or carboxyl;

R' is bromine; cyano; —NR$^3{}_2$;

aryloxy, arylthio, hetaryloxy or hetarylthio, each of which may be mono- or polysubstituted by $C_1$-$C_{12}$-alkyl, $C_1$-$C_{12}$-alkoxy, cyano, —CONHR$^2$ and/or —NHCOR$^2$;

$C_3$-$C_{18}$-alk-1-ynyl whose carbon chain may be interrupted by one or more —O—, —S—, —NR$^1$—, —CO— and/or —SO$_2$— moieties and may be monoor polysubstituted by —COOR$^1$, —SO$_3$R$^1$, hydroxyl, cyano, C$_1$-C$_6$-alkoxy, C$_5$-C$_8$-cycloalkyl, aryl and/or a 5- to 7-membered heterocyclic radical which is bonded via a nitrogen atom and may contain further heteroatoms and be aromatic;

R$^1$ is hydrogen or C$_1$-C$_6$-alkyl;

R$^2$ is hydrogen; C$_1$-C$_{18}$-alkyl; aryl or hetaryl, each of which may be substituted by C$_1$-C$_8$-alkyl, C$_1$-C$_6$-alkoxy, halogen, hydroxyl and/or cyano;

R$^3$ is hydrogen; C$_1$-C$_{18}$-alkyl; aryl or hetaryl, each of which may be substituted by C$_1$-C$_8$-alkyl, C$_1$-C$_6$-alkoxy, halogen, hydroxyl and/or cyano; both R$^3$ radicals may be joined to give a 5- to 7-membered heterocyclic radical which contains the nitrogen atom and is bonded via it;

n is 1, 2, 3 or 4;

m is from 0 to 6, which comprises a) reacting a rylene derivative monobrominated in the peri-position of the general formula II'

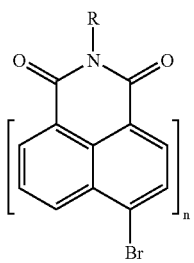

II' with 1,5-diaminoanthraquinone in a double cross-coupling reaction in the presence of an aprotic organic solvent, of a transition metal catalyst system and of a base, b) cyclizing the rylenanthramine formed in step a) of the general formula III"

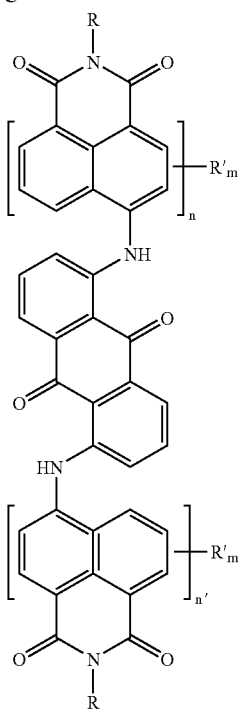

III"

in the presence of a polar organic solvent and of a base to give the rylene dye of the formula I" where m is 0, and c) if desired, converting the rylene dye I" unsubstituted in the rylene core and obtained in step b) to the rylene dye of the formula I" brominated in the rylene core where R' is bromine and m is not equal to 0 by reacting with elemental bromine, and d) if desired, converting the rylene dye I" brominated in the rylene core and obtained in step c)

d1) by reacting with a compound of the general formula IV

IV where Z is sulfur or oxygen and the ring A is an aryl or hetaryl radical, each of which may be mono- or polysubstituted by C$_1$-C$_{12}$-alkyl, C$_1$-C$_{12}$-alkoxy, cyano, —CONHR$^2$ and/or —NHCOR$^2$, in the presence of an inert nitrogen-basic organic solvent and of a base to give the rylene dye of the formula I" which is substituted in the rylene core and where R' is aryloxy, arylthio, hetaryloxy or hetarylthio, each of which may be mono- or polysubstituted by C$_1$-C$_{12}$-alkyl, C$_1$-C$_{12}$-alkoxy, cyano, —CONHR$^2$ and/or —NHCOR$^2$, and m does not equal 0, d2) by reacting with copper(I) cyanide in the presence of a dipolar aprotic organic solvent to give the rylene dye of the formula I" which is substituted in the rylene core and where R' is cyano and m does not equal 0, d3) by reacting with an alkyne of the general formula V

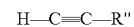

V where R" is a C$_1$-C$_{16}$-alkyl radical which may be interrupted by one or more —O—, —S—, —NR$^1$—, —CO— and/or —SO$_2$— moieties and may be mono- or polysubstituted by —COOR$^1$, —SO$_3$R$^1$, hydroxyl, cyano, C$_1$-C$_6$-alkoxy, C$_5$-C$_8$-cycloalkyl, aryl and/or a 5- to 7-membered heterocyclic radical which is bonded via a nitrogen atom and may contain further heteroatoms and be aromatic, in the presence of an aprotic organic solvent, of a palladium complex as a catalyst, of a copper salt as a cocatalyst and of a base to give the rylene dye of the formula I" which is substituted in the rylene core and where R' is —C≡C—R" and m does not equal 0, or d4) by reacting with ammonia or an amine of the general formula VI

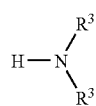

VI in the presence of a dipolar aprotic organic solvent to give the rylene dye of the formula I" which is substituted in the rylene core and where R' is —NR$^3_2$ and m does not equal 0.

5. A process for preparing nonsymmetrical rylene dyes of the general formula I'"

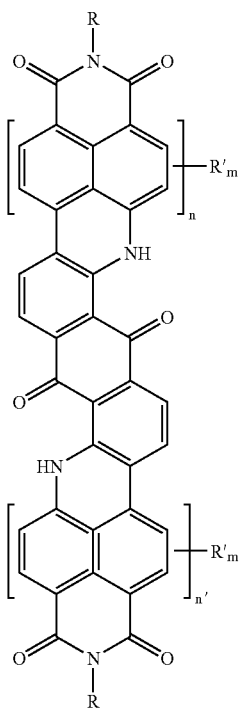

where the variables are defined as follows:
R is hydrogen;
  $C_1$-$C_{30}$-alkyl whose carbon chain may be interrupted by one or more —O—, —S—, —$NR^1$—, —CO— and/or —$SO_2$— moieties and may be mono- or polysubstituted by carboxyl, sulfo, hydroxyl, cyano, $C_1$-$C_6$-alkoxy and/or a 5- to 7-membered heterocyclic radical which is bonded via a nitrogen atom and may contain further heteroatoms and be aromatic;
  $C_5$-$C_8$-cycloalkyl whose carbon framework may be interrupted by one or more —O—, —S— and/or —$NR^1$— moieties and may be mono- or polysubstituted by $C_1$-$C_6$-alkyl;
  aryl or hetaryl which may each be mono- or polysubstituted by $C_1$-$C_{18}$-alkyl, $C_1$-$C_6$-alkoxy, halogen, hydroxyl, cyano, carboxyl, —$CONHR^2$, —$NHCOR^2$ and/or aryl- or hetarylazo, each of which may be substituted by $C_1$-$C_{10}$-alkyl, $C_1$-$C_6$-alkoxy, halogen, hydroxyl, cyano and/or carboxyl;
R' is bromine; cyano; —$NR^3_2$;
  aryloxy, arylthio, hetaryloxy or hetarylthio, each of which may be mono- or polysubstituted by $C_1$-$C_{12}$-alkyl, $C_1$-$C_{12}$-alkoxy, cyano, —$CONHR^2$ and/or —$NHCOR^2$;
  $C_3$-$C_{18}$-alk-1-ynyl whose carbon chain may be interrupted by one or more —O—, —S—, —$NR^1$—, —CO— and/or —$SO_2$— moieties and may be mono- or polysubstituted by —$COOR^1$, —$SO_3R^1$, hydroxyl, cyano, $C_1$-$C_6$-alkoxy, $C_5$-$C_8$-cycloalkyl, aryl and/or a 5- to 7-membered heterocyclic radical which is bonded via a nitrogen atom and may contain further heteroatoms and be aromatic;

$R^1$ is hydrogen or $C_1$-$C_6$-alkyl;
$R^2$ is hydrogen; $C_1$-$C_{18}$-alkyl; aryl or hetaryl, each of which may be substituted by $C_1$-$C_8$-alkyl, $C_1$-$C_6$-alkoxy, halogen, hydroxyl and/or cyano;
$R^3$ is hydrogen; $C_1$-$C_{18}$-alkyl; aryl or hetaryl, each of which may be substituted by $C_1$-$C_8$-alkyl, $C_1$-$C_6$-alkoxy, halogen, hydroxyl and/or cyano; both $R^3$ radicals may be joined to give a 5- to 7-membered heterocyclic radical which contains the nitrogen atom and is bonded via it;
n, n' are each 1, 2, 3 or 4, and n≠n';
m is from 0 to 6,
which comprises
a1) initially reacting a rylene derivative monobrominated in the peri-position of the general formula II'

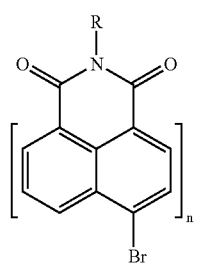

with excess 1,5-diaminoanthraquinone in a first cross-coupling reaction in the presence of an aprotic organic solvent, of a transition metal catalyst system and of a base, a2) reacting the aminorylenanthramine obtained in step a1) of the general formula IIIa

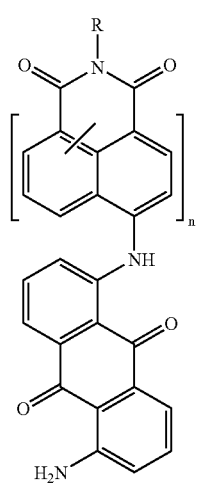

with a rylene derivative monobrominated in the peri-position of the general formula II"

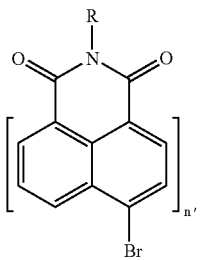

in the presence of an aprotic organic solvent, of a transition metal catalyst and of a base in a second cross-coupling reaction, b) cyclizing the rylenanthramine formed in step a2) of the general formula III'''

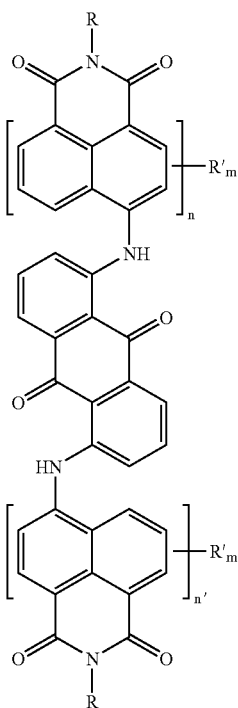

in the presence of a polar organic solvent and of a base to give the rylene dye of the formula I''' which is unsubstituted in the rylene core and where m is 0, and c) if desired, converting the rylene dye I''' unsubstituted in the rylene core and obtained in step b) to the rylene dye of the formula I''' brominated in the rylene core where R' is bromine and m does not equal 0 by reacting with elemental bromine, and d) if desired, converting the rylene dye I''' brominated in the rylene core and obtained in step c)

d1) by reacting with a compound of the general formula IV

where Z is sulfur or oxygen and the ring A is an aryl or hetaryl radical, each of which may be mono- or polysubstituted by $C_1$-$C_{12}$-alkyl, $C_1$-$C_{12}$-alkoxy, cyano, —CONHR$^2$ and/or —NHCOR$^2$, in the presence of an inert nitrogen-basic organic solvent and of a base to give the rylene dye of the formula I''' which is substituted in the rylene core and where R' is aryloxy, arylthio, hetaryloxy or hetarylthio, each of which may be mono- or polysubstituted by $C_1$-$C_{12}$-alkyl, $C_1$-$C_{12}$-alkoxy, cyano, —CONHR$^2$ and/or —NHCOR$^2$, and m does not equal 0, d2) by reacting with copper(I) cyanide in the presence of a dipolar aprotic organic solvent to give the rylene dye of the formula I''' which is substituted in the rylene core and where R' is cyano and m does not equal 0, d3) by reacting with an alkyne of the general formula V

where R'' is a $C_1$-$C_{16}$-alkyl radical which may be interrupted by one or more —O—, —S—, —NR$^1$—, —CO— and/or —SO$_2$— moieties and may be mono or polysubstituted by —COOR$^1$, —SO$_3$R$^1$, hydroxyl, cyano, $C_1$-$C_6$-alkoxy, $C_5$-$C_8$-cycloalkyl, aryl and/or a 5- to 7-membered heterocyclic radical which is bonded via a nitrogen atom and may contain further heteroatoms and be aromatic, in the presence of an aprotic organic solvent, of a palladium complex as a catalyst, of a copper salt as a cocatalyst and of a base to give the rylene dye of the formula I''' which is substituted in the rylene core and where R' is —C≡C—R'' and m does not equal 0, or d4) by reacting with ammonia or an amine of the general formula VI

in the presence of a dipolar aprotic organic solvent to give the rylene dye of the formula I''' which is substituted in the rylene core and where R' is —NR$^3{}_2$ and m does not equal 0.

6. A method for coloring high molecular weight organic and inorganic materials comprising adding the rylene dye as claimed in claim 1 to said high molecular weight organic and inorganic materials.

7. The method as claimed in claim 6 wherein said high molecular weight organic and inorganic materials are plastics, paints, printing inks and oxidic layer systems.

8. A dispersant, a pigment additive for organic pigments and an intermediate for the preparation of pigment additives comprising the rylene dye as claimed in claim 1.

9. A method for producing an aqueous polymer dispersion which is colored or absorbs in the near infrared region of the electromagnetic spectrum comprising adding the rylene dye as claimed in claim 1 to the aqueous polymer dispersion.

10. A photoconductor in electrophotography comprising the rylene dye as claimed in claim 1.

11. A plastic, a paint, a printing ink, and an oxidic layer system comprising the rylene dye as claimed in claim 1.

12. An aqueous polymer dispersion comprising the rylene dye as claimed in claim 1.

\* \* \* \* \*